United States Patent [19]
Taroda et al.

[11] Patent Number: 5,724,542
[45] Date of Patent: Mar. 3, 1998

[54] METHOD OF CONTROLLING DISK CONTROL UNIT

[75] Inventors: Yuichi Taroda, Kawasaki; Kazuma Takatsu, Yokohama; Sanae Kamakura, Kawasaki; Nobukazu Kirigaya, Kawasaki; Hideaki Ohmura, Kawasaki, all of Japan

[73] Assignee: Fujitsu Limited, Kawasaki, Japan

[21] Appl. No.: 303,192

[22] Filed: Sep. 8, 1994

[30] Foreign Application Priority Data

Nov. 16, 1993 [JP] Japan ................................. 5-286339

[51] Int. Cl.$^6$ ............................................. G11B 5/09
[52] U.S. Cl. ....................... 395/440; 395/457; 395/428; 395/821
[58] Field of Search ....................... 395/427, 428, 395/440, 457, 458, 481, 821

[56] References Cited

U.S. PATENT DOCUMENTS

| | | | |
|---|---|---|---|
| 5,204,963 | 4/1993 | Noya et al. | 395/750 |
| 5,388,013 | 2/1995 | Nakamura | 360/48 |

FOREIGN PATENT DOCUMENTS

| | | |
|---|---|---|
| 57-121748 | 7/1982 | Japan. |
| 61-153879 | 7/1986 | Japan. |
| 63-75950 | 4/1988 | Japan. |
| 63-81538 | 4/1988 | Japan. |

Primary Examiner—Jack B. Harvey
Assistant Examiner—Jigar Pancholi
Attorney, Agent, or Firm—Greer, Burns, & Crain, Ltd.

[57] ABSTRACT

An ID portion indicating the corresponding relationship between the number of a record contained in an FBA block and the position of the record is provided at the beginning of the FBA block. When a seek command has been issued by a host apparatus in the CKD format, a device adapter obtains the FBA block number corresponding to the parameter value (CCHH) of a head positioning command and positions a head at the FBA block of this number. Next, the device adapter obtains the FBA block number corresponding to the parameter value (sector value) of a set-sector command, reads one CKD track of blocks from the FBA block designated by the FBA block number and develops these blocks in a cache memory. A channel adapter searches the cache memory for a commanded record by referring to the information in the ID portion.

13 Claims, 37 Drawing Sheets

LOGICAL BLOCK OF FBA FORMAT

FIG. 23

| | GROUP 0 | | GROUP 1 | | BATTERY BACK-UP ON/OFF (NECESSARY/ UNNECESSARY) |
|---|---|---|---|---|---|
| | OFF OK STATE SIGNAL | POWER STATE SIGNAL | OFF OK STATE SIGNAL | POWER STATE SIGNAL | |
| ① | ON (UNNECESSARY) | OFF | OFF | ON | OFF (UNNECESSARY) |
| ② | ON (UNNECESSARY) | OFF | OFF (NECESSARY) | ON→OFF | ON (NECESSARY) |
| ③ | ON (UNNECESSARY) | OFF | ON (UNNECESSARY) | ON→OFF | OFF (UNNECESSARY) |
| ④ | OFF (NECESSARY) | OFF | OFF | ON | OFF (UNNECESSARY) |
| ⑤ | OFF (NECESSARY) | OFF | OFF (NECESSARY) | ON→OFF | ON (NECESSARY) |
| ⑥ | OFF (NECESSARY) | OFF | ON (UNNECESSARY) | ON→OFF | ON (NECESSARY) |

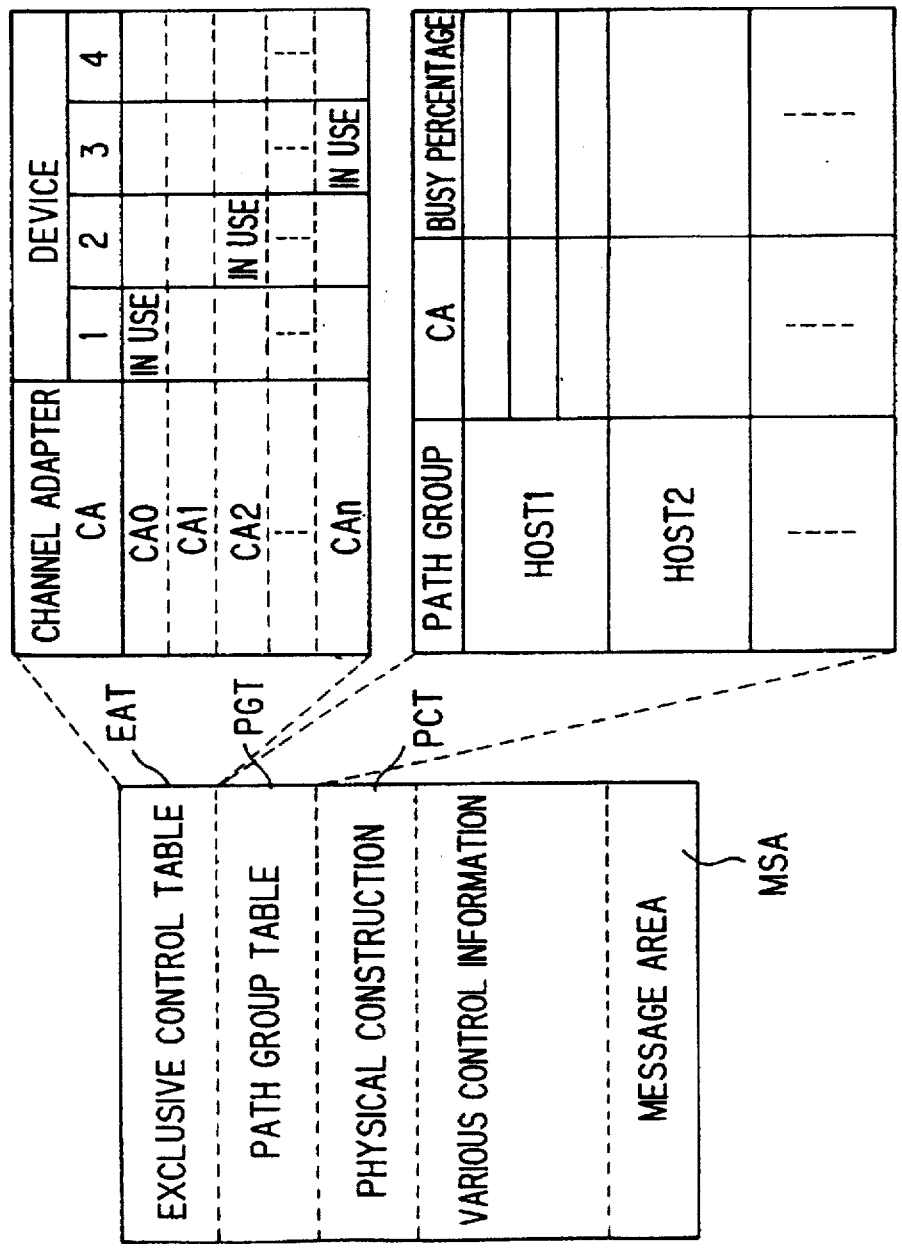

FIG. 31

| OTHER PARTY'S STATUS | STATUS OF SIGNAL LINE FROM OTHER PARTY | | OWN OPERATION (RMO) | | | |
|---|---|---|---|---|---|---|
| | POWER-ON·OFF | CONTROL GROUP READY·NOT READY | ① IML COMPLETE | ② WAITING FOR OTHER PARTY (IML COMPLETE) | ③ TABLE INITIALIZATION IN PROGRESS | ④ ONLINE |
| ① POWER-OFF | × (OFF) | × (NOT READY) | TO INITIALIZATION | TO INITIALIZATION (SEE NOTE 1) | INITIALIZATION COMPLETE → TO ONLINE | |
| ② (RM1) IML IN PROGRESS | ○ (ON) | × (NOT READY) | TO INITIALIZATION | TO INITIALIZATION | | |
| ③ WAITING FOR OTHER PARTY (IML COMPLETE) | ○ (ON) | ○ (READY) | RMO: TO INITIALIZATION RM1: WAITING FOR OTHER PARTY | RMO: TO INITIALIZATION RM1: WAITING FOR OTHER PARTY | | |
| ④ TABLE INITIALIZATION IN PROGRESS | ○ (ON) | ○ (READY) | WAITING FOR OTHER PARTY | WAITING FOR OTHER PARTY | | |
| ⑤ ONLINE | ○ (ON) | ○ (READY) | REQUEST COPY | REQUEST COPY | | EXECUTE COPY PROCESSING IN RESPONSE TO COPY REQUEST FROM OTHER PARTY |

METHOD OF CONTROLLING DISK CONTROL UNIT

BACKGROUND OF THE INVENTION

This invention relates to a method of controlling a disk control unit. More particularly, the invention relates to a method of controlling a disk control unit, which is equipped with a cache memory, for writing command data from a host apparatus to a disk via the cache memory or reading out data, which has been read from the disk, via the cache memory and transferring the read data to the host apparatus.

A magnetic disk subsystem has a direct-access storage device (DASC) serving as an I/O device, and a disk control unit provided between a host apparatus and the direct-access storage device for controlling the writing of data to the direct-access storage device and the reading of data from the direct-access storage device.

Since the direct-access storage device performs a mechanical operation, it is difficult to achieve a high speed in which access time is on the order of milliseconds. The access time actually attained is significantly less than that of a semiconductor memory. Accordingly, a disk control unit internally equipped with a cache memory for the purpose of raising access speed has been made available. This device, which utilizes the fact that access from the host tends to concentrate on specific data in the direct-access storage device, copies data referred to frequently to the cache memory and, when reaccess to the copied data is required, transfers the data directly from the cache memory rather than access the data in the direct-access storage device. Since the data is rearranged based upon an LRU (least recently used) algorithm, data having a high frequency of access is retained at this time. Thus, data having a high frequency of access does not require a mechanical operation, thereby making it possible to greatly shorten I/O response time.

FIG. 1 is a diagram showing the configuration of a system which includes a disk control unit (DCU) equipped with a cache memory. Numeral 10 denotes a host apparatus (CPU) provided with a plurality of channels 20a, 20b, 20c ..., 30 a disk control unit and 40a~40f direct-access storage devices (DASD).

The disk control unit 30 includes channel adapters (CA) 31a~31c and 31a'~31c' for interfacing the host apparatus 10, device adapters (DA) 32a~32c and 32a'~32c' for interfacing the direct-access storage devices, a cache memory 33, cache function engines (CFE) 34a, 34a' for managing the cache memory and executing processing such as a hit/miss decision, resource managers (RM) 35a, 35a' for performing control related to overall resource management and processing operations, service adapters (SA) 36a, 36a' for executing IML (initial microprogram loading), status monitoring processing and malfunction recovery processing with regard to each of the units, and non-volatile memories (PS) 37a, 37a', such as magnetic disk devices, for storing microprograms for control of each unit.

The foregoing units are interconnected by buses 38a, 38a', each of which a C-BUS, a D-BUS and an S-BUS, not shown. The C-BUS is a control bus through which each unit communicates messages and accesses control information, the D-BUS is a data transfer bus through which each unit performs an exchange of data, and the S-bus is a service bus through which the service adapters 36a, 36a' serves as masters for managing the status of each unit. A control panel, not shown, is connected to the service adapters 36a. 36a'.

The disk control unit of FIG. 1 has a redundant structure arranged in symmetrical left and right halves about a center dashed line (G0 represents a first controller side or Group 0 and G1 represents a second controller side or Group 1). The cache memory 33 constitutes a common or shared module. The CPU 10 is connected to the channel adapters CA of the first controller side G0 and second controller side G1 via prescribed channels, and the direct-access storage devices (DASD) 40a~40f are capable of being accessed from the first controller side G0 and second controller side G1. Accordingly, even if channel adapters or device adapters on one side fail, the CPU 10 can still access the direct-access storage devices from the channel adapters or devices adapters on the other side.

The channel adapters 31a~31c', device adapters 32a~32c', cache function engines 34a~34a', resource managers 35a~35a' and service adapters 36a, 36a' are each constituted by a microprocessor and generally have the construction shown in FIG. 2. Specifically, each device includes a microprocessor (MPU) 51, a control store (CS) 52 comprising a RAM, a control store (CS) 53 comprising a ROM, a driver/receiver (DV/RV) 54 connected to the internal buses 38a, 38a', bus interface logic (BIL) 55, a driver/receiver (DV/RV) 56 connected to an external interface, a buffer or control table store (TS) 57 and a separate LSI (gate array) 58. The control table store 57 of the resource managers 35a, 35a' store various control tables, such as an exclusive management table EAT (not shown), a path group table PGT and a physical construction table PCT, by way of example.

Data is stored on each track of a direct-access storage device in accordance with a CKD format. FIG. 3 is a diagram for describing the CKD data format. The track has several areas demarcated by gaps and is provided at its head with an index mark. A home address area HA is an area which describes the address of the track at which it itself is present. The area is provided after the index mark. A plurality of records R0, R1, R2, ... composed of a count area C, key area K and data area D are written after the home address area. A track address CCHH (where CC represents a cylinder address and HH represents a head address), a record number R and lengths of the succeeding key and data areas, etc., are written in the counter area C. Accordingly, the individual records can be designated by designating the track address and record number. It is not always necessary to write a retrieval key in the key area K. User data is written in the data area D.

In accordance with the disk control unit (DCU) 30, data is read and written in the manner described below. FIGS. 4 and 5 are diagrams for describing the flow of a record when data is read. FIG. 4 illustrates the flow in a case where a read hit is not achieved (a case in which a read record is not present in the cache memory), and FIG. 5 shows the flow when there is a read hit. A buffer BF incorporated within the cache function engine CFE stores an address (CCHHR) of a record present in the cache memory CM and a flag FLAG indicating whether the record has been saved in a direct-access storage device DASD (where "1" logic in the flag indicates that the record has not been saved and "0" indicates that the record has been saved).

When a seek command SK is issued by a channel device CH, the channel adapter CA queues the seek command in a command queue and subsequently sends an operation-finished signal back to the channel device CH to make it appear that the seek operation has ended. The channel device CH issues a set-sector command SS in response to reception of the seek operation-finished signal. When this command is received, the channel adapter CA queues the command and then sends an operation-finished signal back to the channel device CH to make it appear that the set-sector operation has ended. The channel device CH issues a search ID command SID in response to reception of the set-sector operation-finished signal. When this command is received, the channel adapter CA inquires of the cache function engine CFE whether the record of the requested address (CCHHR) is present in the cache memory CM.

If the requested record is not present in the cache memory CM, then the channel adapter CA informs the resource manager RM of this fact and issues a retry signal in order to cut off the channel device CH from the disk control unit DCU. In response to reception of the retry signal, the channel device CH is temporarily cut off from the disk control unit DCU and is capable of executing services for another disk control unit during this time. Further, in a case where a command request signal is received subsequently after the channel device CH is cut off in response to reception of the retry signal, the command issued immediately prior thereto (the search ID command in this example) is re-sent.

The resource manager RM refers to the exclusive control table to verify that the direct-access storage device sought is not in the process of being accessed, determines the prescribed device adapter DA, notifies the channel adapter CA of the identification data of this device adapter and notifies this device adapter DA of the identification data of the channel adapter.

The channel adapter CA delivers the CKD track position (CCHH) contained in the seek command to the notified device adapter DA and designates staging. When staging is designated, the device adapter DA reads one designated CKD track (CCHH) of data and writes this data in the cache memory CM (see FIG. 4). After the writing operation, the device adapter DA notifies the channel adapter CA of end of staging. In response, the channel adapter CA sends a command request signal to the channel device CH. Upon receiving the command request, the channel device CH reissues the search ID command SID issued last. If the channel adapter CA receives the search ID command SID, it retrieves the designated record in the cache memory CM and sends a search ID operation-finished signal to the channel device CH in response to end of retrieval. If the channel device CH receives the search ID operation-finished signal, it issues a read command RD. If the channel adapter CA receives the read command RD, it reads the searched record out of the cache memory CM and transfers this record to the channel device CH.

If, on the other hand, the record requested by the search ID is present in the cache memory CM (read hit), the channel adapter CA sends a command request signal to the channel device CH. Upon receiving the command request, the channel device CH issues the read command RD. Upon receiving the read command RD, the channel adapter CA reads the requested record out of the cache memory CM and transfers it to the channel device CH. (see FIG. 5).

FIGS. 6 and 7 are diagrams for describing the flow of a record when data is written. FIG. 6 illustrates the flow in write-thru, and FIG. 7 shows the flow when there is a write hit.

When the seek command SK is issued by a channel device CH, the channel adapter CA queues the seek command in a command queue and subsequently sends an operation-finished signal back to the channel device CH to make it appear that the seek operation has ended. The channel device CH issues the set-sector command SS in response to reception of the seek operation-finished signal. When this command is received, the channel adapter CA queues the command and then sends an operation-finished signal back to the channel device CH to make it appear that the set-sector operation has ended. The channel device CH issues the search ID command SID in response to reception of the set-sector operation-finished signal. When this command is received, the channel adapter CA inquires of the cache function engine CFE whether the record of the requested address (CCHHR) is present in the cache memory CM.

If the requested record is not present in the cache memory CM, then the channel adapter CA informs the resource manager RM of this fact and issues a retry signal in order to cut off the channel device CH from the disk control unit DCU. In response to reception of the retry signal, the channel device CH is temporarily cut off from the disk control unit DCU.

The resource manager RM refers to the exclusive control table to verify that the direct-access storage device sought is not in the process of being accessed, determines the prescribed device adapter DA, notifies the channel adapter CA of the identification data of this device adapter and notifies this device adapter DA of the identification data of the channel adapter.

The channel adapter CA delivers the position parameter (CCHH) contained in the seek command to the notified device adapter DA, causes the direct-access storage device DASD to execute a seek operation, delivers the position parameter (sector value) contained in the set-sector command in response to completion of the seek operation causes the direct-access storage device DASD to execute the set-sector operation in similar fashion. If the set-sector operation is completed, the channel adapter CA sends a channel-command request signal to the channel device. Upon receiving the command request, the channel device CH reissues the search ID command SID issued last. If the channel adapter CA receives the search ID command SID, it delivers the parameter (record number R) of the search ID to the device adapter DA, causes the direct-access storage device DASD to execute the search ID operation and, if the search operation is completed, sends the operation-finished signal to the channel device CH.

If the channel device CH receives the search operation-finished signal, it issues a read command WD. If the channel adapter CA receives the read command RD, it writes the data (the record) in the cache memory CM and also writes the data in the command address CCHHR of the direct-access storage device DASD via the device adapter DA (see FIG. 6). Furthermore, the address (CCHHR) (flag "0") of the written record is stored in the memory of the cache function engine CFE.

The foregoing processing is referred to as "write-thru". In write-thru, the record is written in the direct-access storage device DASD in concurrence with the writing of the record in the cache memory. The result is a low access speed. Accordingly, a disk control device also is available in which access speed is raised by providing a non-volatile memory NVS within the disk control unit DCU and terminating the writing operation upon writing the record in the non-volatile memory in concurrence with the writing of the record in the cache memory.

If, on the other hand, the record at the address (CCHHR) requested by the search ID is present in the cache memory CM (write hit), the channel adapter CA sends a command request signal to the channel device CH. Upon receiving the command request, the channel device CH issues the write command WD. Upon receiving the write command WD, the channel adapter CA rewrites the record of CCHHR that has been stored in the cache memory CM (see FIG. 7). At this time the flag corresponding to CCHHR stored in the memory of the cache function engine CFE is changed to "1" Thereafter, independently of the operation of the host, the disk control unit writes the record of CCHHR for which the flag is "1" from the cache memory CM to the direct-access storage device DASD (this is referred to as "write-back") and makes the flag "0" in response to write-back.

The function for write hit and the write-back operation is referred to as a high-speed write mode. In order to implement this mode, the cache memory CM must be backed up by a battery. The reason for this is that data which has not yet been subjected to the write-back operation in the cache memory CM would be lost in the event of inadvertent cut-off of power.

FIG. 8 is a block diagram illustrating a disk control unit DCU provided with a battery unit for battery back-up. Components identical with those shown in FIG. 1 are designated by like reference characters but some of the identical components have been deleted from the drawing.

In FIG. 9, numerals 39a, 39a' denote unit power controllers (UPC), and 39c designates a battery unit (BTU). The unit power controller 39a of Group 0 (G0) controls the introduction of power to and the cut-off of power from each unit and the cache memory 33 on the side of Group 0 based upon the on/off status of a power supply switch and applies a power-status signal PWC indicative of the on/off status of the power supply to the battery unit 39c. Similarly, the unit power controller 39a' of Group 1 (G1) controls the introduction of power to and the cut-off of power from each unit and the cache memory 33 on the side of Group 1 based upon the on/off status of a power supply switch and applies a power-status signal PWC' indicative of the on/off status of the power supply to the battery unit 39c. The latter refers to the power-status signal PWC, PWC' and supplies battery voltage to the cache memory 33, thereby to retain the data stored therein, only if the power supplies of both groups are in the off state.

In a case where the operating system (OS) is handling data using the CKD format, only a disk device (CKD disk device) premised on the CKD format can be connected to the disk control unit DCU.

In recent years, advances in technology have made it possible to greatly increase the capacity of an FBA (fixed-block architecture) disk device possessing an interface such as an SCSI, and it is becoming possible to realize a capacity comparable with that of the conventional CKD disk device. As shown in FIG. 9, the FBA format is such that the lengths of all logic blocks (FBA blocks) are equal, with one CKD track being partitioned into a prescribed number of FBA blocks. The FBA blocks have identification numbers 1, 2, 3 . . . specific to them, and a 64-byte ID portion for a CKD.FBA format conversion (COF: CKD ON FBA) is provided at the head of each FBA block. Further, an ID portion (block ID portion for FBA) storing the FBA block address (the identification umber of the FBA block) is provided ahead of each FBA block. Such an FBA disk device is small in size and low in price and maintains a performance that allows it to be used fully as an external storage device for a large-scale computer system.

According to a CKD control method, it is required that the CKD format transferred from the host apparatus be converted to the FBA format within the disk control unit in order that the FBA disk device can be applied to a system in which the host apparatus handles data (see FIG. 10). Further, in a case where FBA data is read from an FBA disk via an SCSI interface, it is required that the FBA data be transferred to the host apparatus after it is converted to the CKD format. However, an effective method of performing the CKD.FBA format conversion (COF conversion) is not available in the prior art. In particular, in a case where use is made of the CKD disk, the disk control unit reads a record upon performing a positioning operation conforming to the seek command, set-sector command and search ID command from the host apparatus. However, in a case where the FBA disk device is used, it is not possible in the prior art to perform control similar to that in the case of the CKD disk by a seek command, set-sector command and search ID.

Further, in a mutual conversion between the CKD and FBA formats (COF conversion: CKD ON FBA), written or read data is developed in a cache memory and then subjected to the COF conversion. In this case, when data is transferred to the host apparatus, the device adapter DA is allowed to transfer the data to the channel adapter CA. When data is transferred to the FBA disk, the channel adapter CA is allowed to transfer the data to the device adapter DA. With this method, however, a problem which arises is that the parallel transfer (the data transfer between the device adapter DA and the cache memory CM and the data transfer between the cache memory CM and the channel adapter DA) that was possible with the CSK disk device is impossible here. Further, according to this method, response time is prolonged greatly, with the end result being a much longer overall processing time. This leads to a decline in the performance of the system.

Furthermore, the conventional back-up control of the cache memory is such that when power is cut off in Groups 0 and 1, the cache memory is always backed up by the battery irrespective of whether data to be backed up is present in the cache memory. With this battery back-up method, however, often the battery is depleted when the power supply is turned on. In such case, the high-speed writing mode cannot be used, and the apparatus therefore must be operated only in the write-thru mode, until the battery is fully charged.

In addition, the disk control unit is provided with redundancy in order to improve the functionality and the RAS performance of the dick control unit. By virtue of redundant structure, operation can continue with one control group if the other control group goes down. For example, since the host apparatus is connected to the channel adapters of Groups 0 and 1, a direct-access storage device can be accessed via one channel adapter if the other channel adapter does down because of a failure. Further, the device adapters of Groups 0 and 1 are capable of accessing the same direct-access storage device. This means that if one device adapter goes down, the direct-access storage device can be accessed via the other device adapter.

However, in the resource manager RM that performs job control, carries out management control of the resources within the disk control unit and controls the information of the devices under the supervision of the control unit, redundancy is not achieved in the original sense of the word. That is, the various tables and control information being held in the control table stores of both groups differ from each other; if one resource manager goes down, the resource manager of the other group cannot be substituted for it. Accordingly, it has been conceived to perform updating at all times in order to make the control information identical in the resource managers of both groups (where the resource information is job content/order/control information from the host side, resource information within the control unit, the status of each device, etc.). This method is acceptable in a case where both groups are operating normally. However, a problem encountered is how to update and initialize the control information (control tables) of a group itself when the unit is started up, when the power supply of one group goes down, when one group is started up, during initialization of the control information (control tables) and, further, when communication with the other party is interrupted.

SUMMARY OF THE INVENTION

Accordingly, a first object of the present invention is to provide a method of controlling a disk control unit whereby even if the disk device is an FBA disk device, control can be carried out in the same manner as performed in the case of a CKD disk device.

A second object of the present invention is to provide a method of controlling a disk control unit whereby even if the disk device is an FBA disk device, control conforming to a seek command, set-sector command and search ID command can be carried out in the same manner as performed in the case of a CKD disk device, and similar data transfer control (concurrent transfer control) can be carried out.

A third object of the present invention is to provide a method of controlling a disk control unit whereby a cache memory is backed upon only in a case where data to be backed up is present in the cache memory, thereby preventing depletion of the battery and making possible use of the high-speed writing mode immediately after power is introduced.

A fourth object of the present invention is to provide a method of controlling a disk control unit whereby control information (control tables) possessed by resource managers of Groups 0 and 1 is made the same at all times regardless of the status of the group.

The first object of the invention is attained by providing a method of controlling a disk control unit comprising the steps of providing, at a prescribed position of an FBA block, an ID portion indicating a corresponding relationship between a number of a record contained in the FBA block and a position of the record, obtaining an FBA block number corresponding to a parameter value of a head positioning command when the head positioning command has been issued from a host apparatus in a CKD format, reading and developing in a cache memory, by a device adapter, blocks from an FBA block designated by the FBA block number to a final FBA block within a CKD track to which the FBA block belongs, and retrieving a record, which has been designated by the host apparatus, in the cache memory by a channel adapter by referring to the corresponding relationship.

The second object of the invention is attained by providing a method of controlling a disk control unit comprising the steps of providing, at a prescribed position of an FBA block, an ID portion indicating a corresponding relationship between a number of a record contained in the FBA block and a position of the record, obtaining an FBA block number corresponding to a parameter value of a head positioning command when the head positioning command has been issued from a host apparatus in a CKD format, causing a device adapter to read and store, in an internal buffer, blocks from an FBA block designated by the FBA block number to a final FBA block within a CKD track to which the FBA block belongs, and to develop the blocks in a cache memory one FBA block or plural FBA blocks at a time from the buffer while the blocks are being stored in the buffer, causing the device adapter to issue a completion notification whenever storage of one FBA block or plural FBA blocks of data in the cache memory is completed, and causing a channel adapter to search the cache memory for a record, which has been designated by the host apparatus, by referring to the corresponding relationship whenever the completion notification is issued, and, in a case where the designated record exists, to read the record out of the cache memory and transfer it to the host apparatus.

The third object of the invention is attained by providing a method of controlling a disk control unit comprising the steps of determining, at cut-off of power, whether data that has been stored in a cache memory has been saved on a disk, backing up the cache memory by a battery if the data has not been saved, and refraining from backing up the cache memory if the data has been saved.

The fourth object of the invention is attained by providing a method of controlling a disk control unit comprising the steps of interconnecting resource managers of respective groups by ① a conduction-state notification signal line, ② an operating-state notification signal line for notifying of distinction between ready/not-ready, ③ an interrupt line for notifying of a message to be communicated and ④ a copy bus; in a case where the resource manager of one group has updated the contents of a control table when the resource managers of both groups are operating normally, notifying the other resource manager of the fact of updating via an interrupt line; causing the other resource manager to read the updated data out of a control table store of the one group via the copy bus; and causing the other resource manager to update its own control table store by this data.

Other features and advantages of the present invention will be apparent from the following description taken in conjunction with the accompanying drawings.

BRIEF DESCRIPTION OF THE DRAWINGS

FIG. 23 is a chart for describing the on/off state of a battery in a battery unit;

FIG. 30 is a diagram for describing the contents of a control table store;

FIG. 31 is a diagram for describing the processing method of a control table;

DESCRIPTION OF THE PREFERRED EMBODIMENTS (a) Overview of the invention

Figure 11:
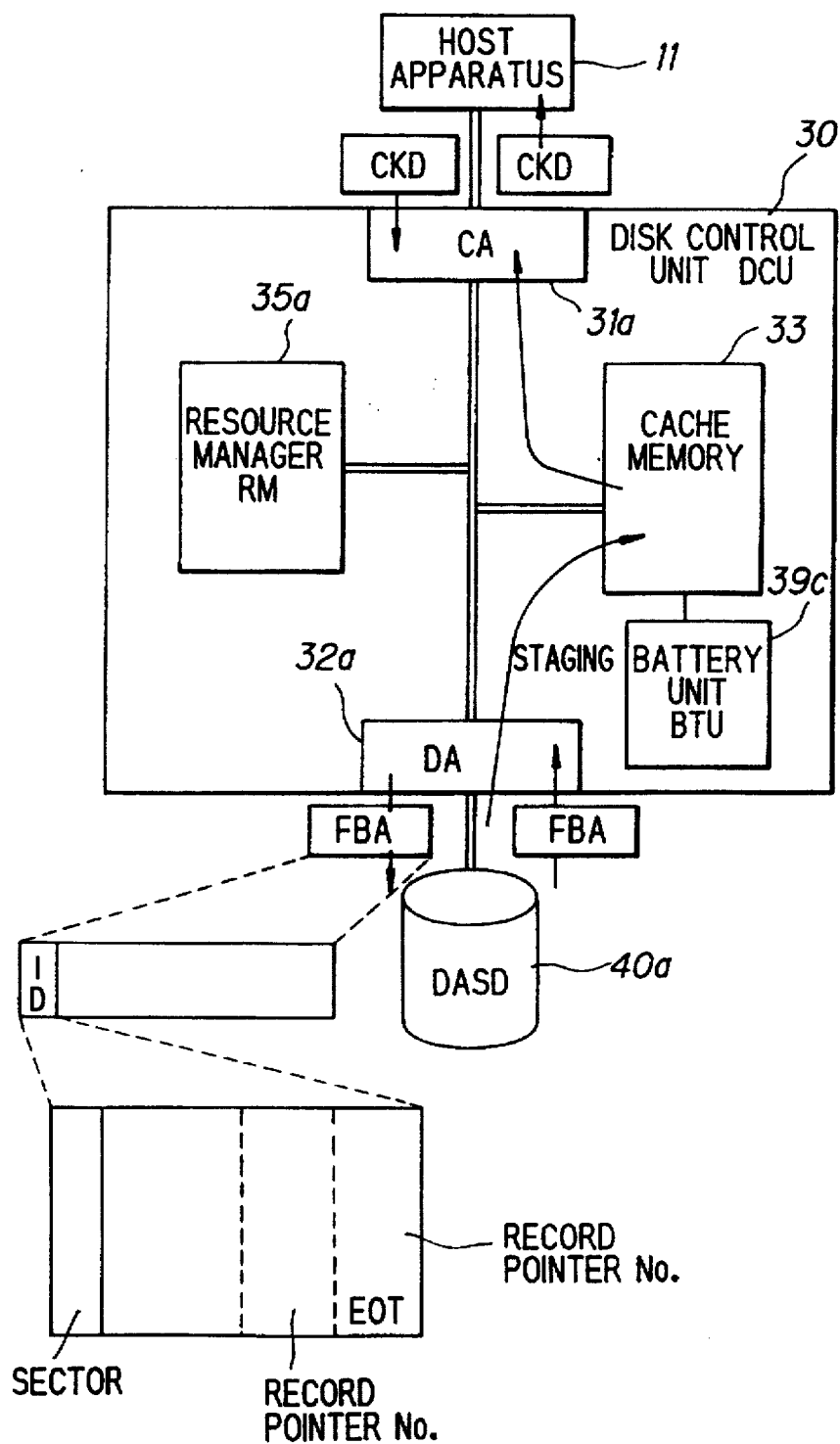
FIG. 11 is a diagram for describing the principles of the present invention.

FIG. 11 is a diagram for describing an overview of the present invention.

Shown in FIG. 11 are a host apparatus 11, the disk control unit (DCU) 30 and the direct-access storage device (DASD) 40a for reading/writing of data in the FBA format. The direct-access storage device 30 includes the channel adapter (CA) 31a for interfacing the host apparatus 11, the device adapter (DA) 32a for interfacing direct-access storage device 40a, the cache memory 33, the resource manager 35a for controlling overall resource management and various processing operations, and the battery unit (BTU) 39a for backing up the cache memory 33 with a battery.

An ID portion indicating the corresponding relationship between the number of a record contained in an FBA block and the position of the record is placed at a fixed position (the beginning) of the FBA block. When a head positioning command (seek command, set-sector command, search command) is issued by the host apparatus 11 in a CKD format, the device adapter 32a obtains the number of the head FBA block, of one CKD track, corresponding to the parameter value (CKD track number CCHH) of the seek command and positions the head at the FBA block position having this number. Next, the device adapter 32a obtains the number of the head FBA block corresponding to the parameter value (sector value) of the set-sector command, reads all blocks from the FBA block designated by the head FBA block number to the last FBA block within the CKD track to which the head FBA block belongs and develops these blocks in the cache memory 33. Thereafter, the channel adapter 31a refers to the corresponding relationship stored in the ID portion to retrieve the record commanded by the host apparatus 11. In the case of a read operation, the channel adapter 31a reads the retrieved CKD record from the cache memory 33 and transfers it to the host apparatus 11. In the case of a write operation, the channel adapter 31a rewrites the record in the cache memory and then writes the rewritten record in the FBA disk unit 40a in FBA block units.

If the record contained in an FBA block is the last record in the CKD track, this fact [EOT (end of track)] is registered in the ID portion of this FBA block in advance so that blocks up to the FBA block containing the data EOT will be read as one CKD track developed in the cache memory 33.

If this arrangement is adopted, positioning control and data-retrieval control with regard to a seek command, set-sector command and search ID command can be performed in the same manner as with a CKD disk device even if the device is an FBA disk device.

Further, the device adapter 32a reads the blocks of one CKD track from the FBA block designated by the FBA block number, stores these blocks in an internal buffer, develops the blocks in the cache memory 33 one FBA block or plural FBA blocks at a time from the buffer while the blocks are being stored in the buffer, and issues a completion notification whenever storage of one FBA block or plural FBA blocks of data in the cache memory 33 is completed. Whenever the completion notification is issued, the channel adapter 31a searches for the record, which has been commanded by the host apparatus, in the cache memory 33. In a case where the record exists, the channel adapter 31a reads the record out of the cache memory 33 and transfer it to the host apparatus 11. As a result, even if the disk device is an FBA disk device, data transfer control (concurrent transfer control) can be carried out in the same manner as with a CKD disk device.

Furthermore, the battery unit 39c determines, at cut-off of power, whether data that has been stored in a cache memory 33 has been saved on the direct-access storage device 40a, backs up the cache memory 33 with a battery if the data has not been saved, and does not back up the cache memory 33 if the data has been saved. In a case where the disk control unit 30 is provided with redundancy and the cache memory 33 is shared by first and second groups, the battery unit 39c stores, at cut-off of power in the first group, whether data that has been stored in a cache memory 33 relating to the first group has been saved on a disk device. When the power supply of the second group is cut off in this state, the battery unit 39c determines whether the stored data in the cache memory 33 relating to the second group has been saved on the disk device. If this data has been saved, then the battery unit 39c decides, on the basis of whether the data relating to the first group has been saved or not, the necessity of battery back-up of the cache memory 33. If the data related to the second group has not been saved, the battery unit 39c backs up the cache memory 33 with the battery regardless of whether the data relating to the first group has been saved or not. As a result, the battery unit 39c backs up the cache memory 33 only in a case where data to be backed up is present in the cache memory 33. This makes it possible to prevent depletion of the battery and, hence, enables utilization of the high-speed write mode immediately after the introduction of power.

In the case where the disk control unit 30 is provided with redundancy, the resource managers of respective groups are interconnected by a conduction-state notification signal line, an operating-state notification signal line for notifying of distinction between ready/not-ready, an interrupt line for notifying of a message to be communicated and a copy bus. In a case where the resource manager of one group has updated the contents of an internal control table when the resource managers of both groups are operating normally, the resource manager of the other group is informed of the fact of updating via an interrupt line. In response to notification, the other resource manager reads the updated data out of the control table store of the first group via the copy bus and updates the contents of its own control table store by this data.

Further, after the completion of IML (initial microprogram loading), the resource manager of the first group identifies the ready/not-ready state of the resource manager of the second group from the operating-state notification signal line and, in the case of the ready state, investigates whether the resource manager of the second group is in a state in which it is waiting for the other party, in a control-table initialization state or in the process of an online operation, this being performed by communication between the resource managers using the interrupt line and copy bus. The resource manager of the first group ① initializes a control table if the resource manager of the other party is in the waiting state; ② if the resource manager of the other party is in the state in which the control table is being initialized, the resource manager of the first group enters a state in which it waits for completion of initialization of the control table of the other party, and copies the contents of the control table; and ③ if the resource manager of the other party is performing an online operation, the resource manager of the first group copies the control table of the other party. As a result, control tables possessed by resource managers of Groups 0 and 1 can be made the same at all times regardless of the status of the groups. If the resource manager of one group goes down, control can continue using the resource manager of the other group. This makes it possible to prevent the entire system from going down.

(b) First embodiment of the invention (b-1) Group configuration

Figure 12:
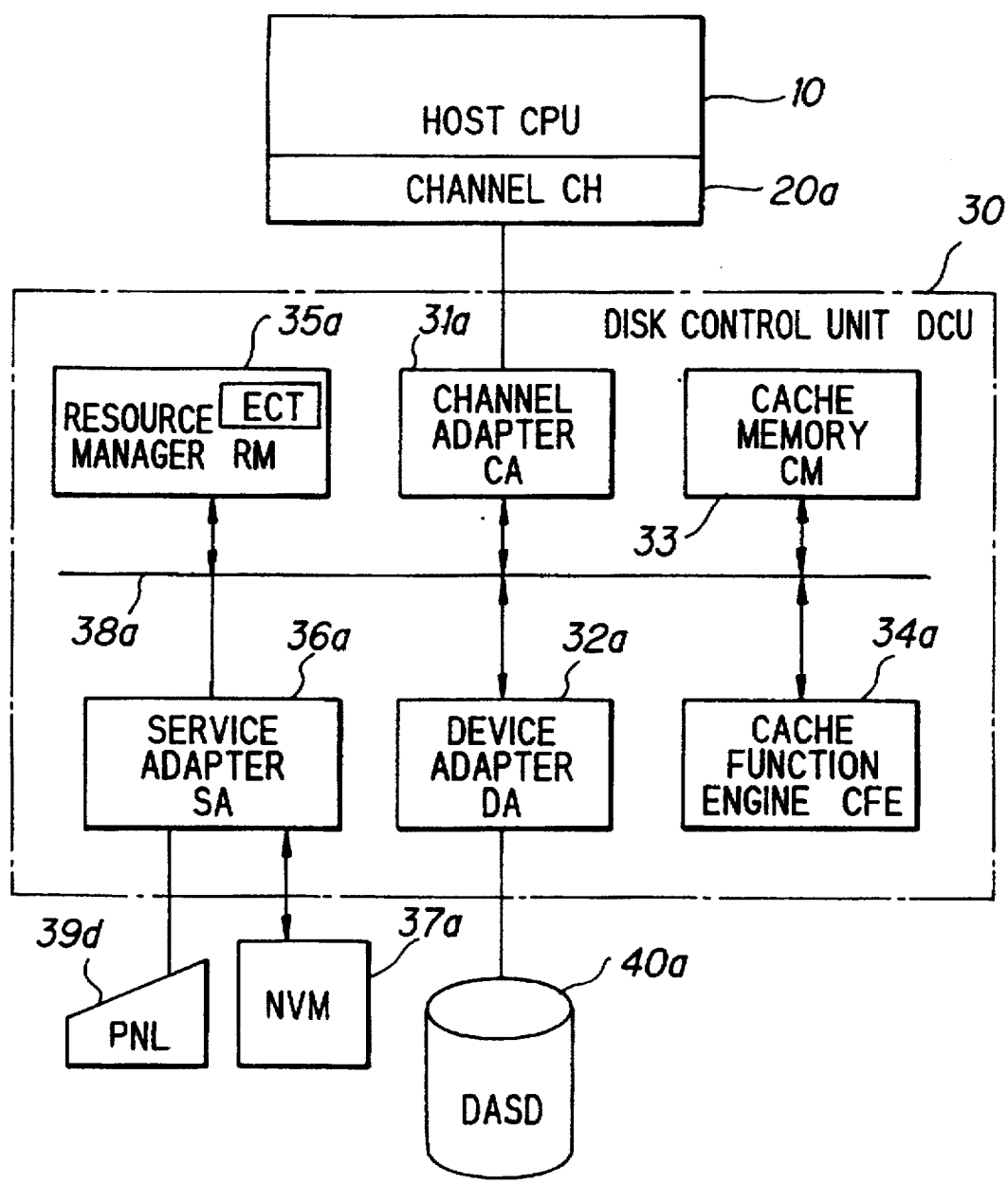
FIG. 12 is a block diagram illustrating the system configuration of the present invention.

FIG. 12 is a block diagram illustrating the system configuration of a first embodiment according to the present invention for carrying out positioning control and data retrieval control similar to that executed in the case of a CKD disk device, even if the device is an FBA disk device. In order to simplify the description, only one channel adapter, one device adapter and one bus line are shown.

Shown in FIG. 12 are the host apparatus (CPU) 10 equipped with an OS for handling data in the CKD format, the channel (CH) 20a, the disk control unit (DCU) 30, and the direct-access disk device (DASD) for reading/writing data in the FBA format.

The disk control unit 30 includes the channel adapter (CA) 31a for interfacing the host apparatus 10, the device adapter (DA) 32a for interfacing direct-access storage device 40a, the cache memory 33, the cache function engine (CFE) 34a for executing management of the cache memory 33 and processing such as a hit/miss decision, the resource manager (RM) 35a for performing control related to overall resource management and processing operations, and the service adapter (SA) 36a for executing IML processing, status monitoring processing and malfunction recovery processing with regard to each of the units. Connected to the DCU 30 are the non-volatile memory 37a for storing microprograms for control of each unit as well as control tables, and a control panel 39d. The foregoing units are interconnected by bus 38a, which has a C-BUS, a D-BUS and an S-BUS, which are not shown. The channel adapter 31a, device adapter 32a, the cache function engine 34a and the resource manager 35a are each constituted by a microprocessor. Initially, the control microprograms and control tables are loaded (IML) from the memory 37a under control performed by the service adapter SA.

(b-2) Constitution of FBA block

Figure 13:
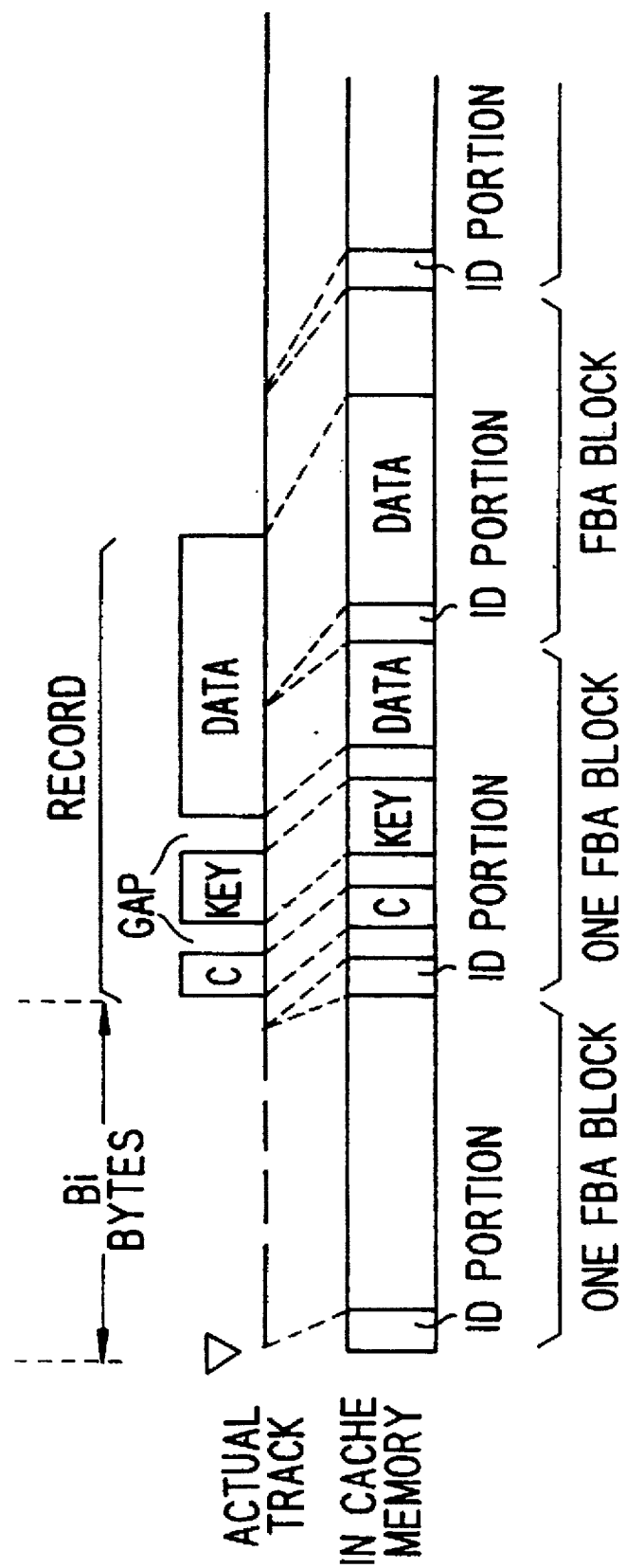
FIG. 13 is a diagram for describing development in a cache memory for format conversion.

Data is written to and read from the direct-access disk device 40a in FBA block units via the cache memory 33. In this case, as shown in FIG. 13, on the assumption that each CKD record is present at a position distances Bi bytes away from an index on a physical track, then the record will be located at a position the same Bi bytes from the head of the memory even in the cache memory. When the track is partitioned into FBA blocks, an ID portion (e.g., an FBA block ID and a 64-byte COF ID) is inserted at the head of each FBA block. With regard also to gaps on the actual track, dummy data of the same length is provided in the cache memory.

Figure 14:
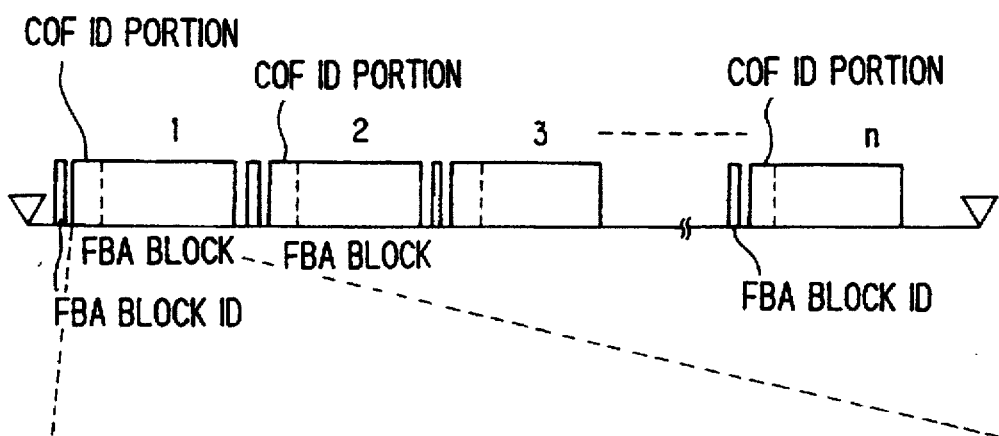
FIG. 14 is a diagram for describing an FBA format.

As shown in FIG. 14, the FBA blocks have identical lengths obtained by partitioning the length of the physical track into n portions, and each FBA block has the 64-byte COF ID portion and the FBA block ID portion at the beginning thereof. The 64-byte COF ID portion has the content indicated below. Specifically, the following is recorded in this ID portion:

① a relative number of the pertinent FBA block in the CKD track;

② a block flag which designates information specific to the FBA block (e.g., the fact that a valid record is present in this block);

③ a track flag which designates information specific to the track (e.g., a normal track, an alternate track, a faulty track, a flawed alternate track, etc.);

④ a logic address CCHH of the CKD track to which this FBA block belongs;

⑤ a logic address CCHH or faulty-track logic address CCHH (ALT CCHH) of a CCK track replaced;

⑥ the number of individual records present in this FBA block; and

⑦ information (record descriptors) of individual records present in this block, as well as the number of bytes (record pointer, record position) from the head of this block to the count/HA (home address)/EOT (end of track) of each record. The nine bits from the 15th to the 9th bits of a record descriptor have the meanings given below, and the other bits, namely the 8th to 0th bits, are not used or are employed in other applications.

Bit 15: a standard record (a record in which the values of the physical address and logic address agree)

Bit 14: an HA (home address) field

Bit 13: an EOT (end of track) field

Bit 12: record is accommodated in this block
Bit 11: interrupt has occurred in writing of count portion C
Bit 10: interrupt has occurred in writing of key portion K
Bit 9: interrupt has occurred in writing of data portion D According to the method set forth above, data (a record) is partitioned into FBA blocks and developed in the cache memory 33, whereby writing of data to or reading of data from an FBA disk is performed in single FBA block units. In other words, at the time of a write operation, the device adapter 32a is capable of writing the necessary block in the disk device treating the ID portion as the header and the data up to a point just short of the next ID portion as one FBA block. Further, at the time of a read operation, the device adapter 32a reads the FBA block to be read from the FBA disk device 40a, and develops it in the cache memory 33, based upon the parameter value (sector value) designated by the set sector. Thereafter, the channel adapter 31a analyzes the ID portion of the developed data and transfers only the data of the field requested by the host apparatus.

The reading and writing of data will now be described in detail.

(b-3) Reading of data

Figure 15:
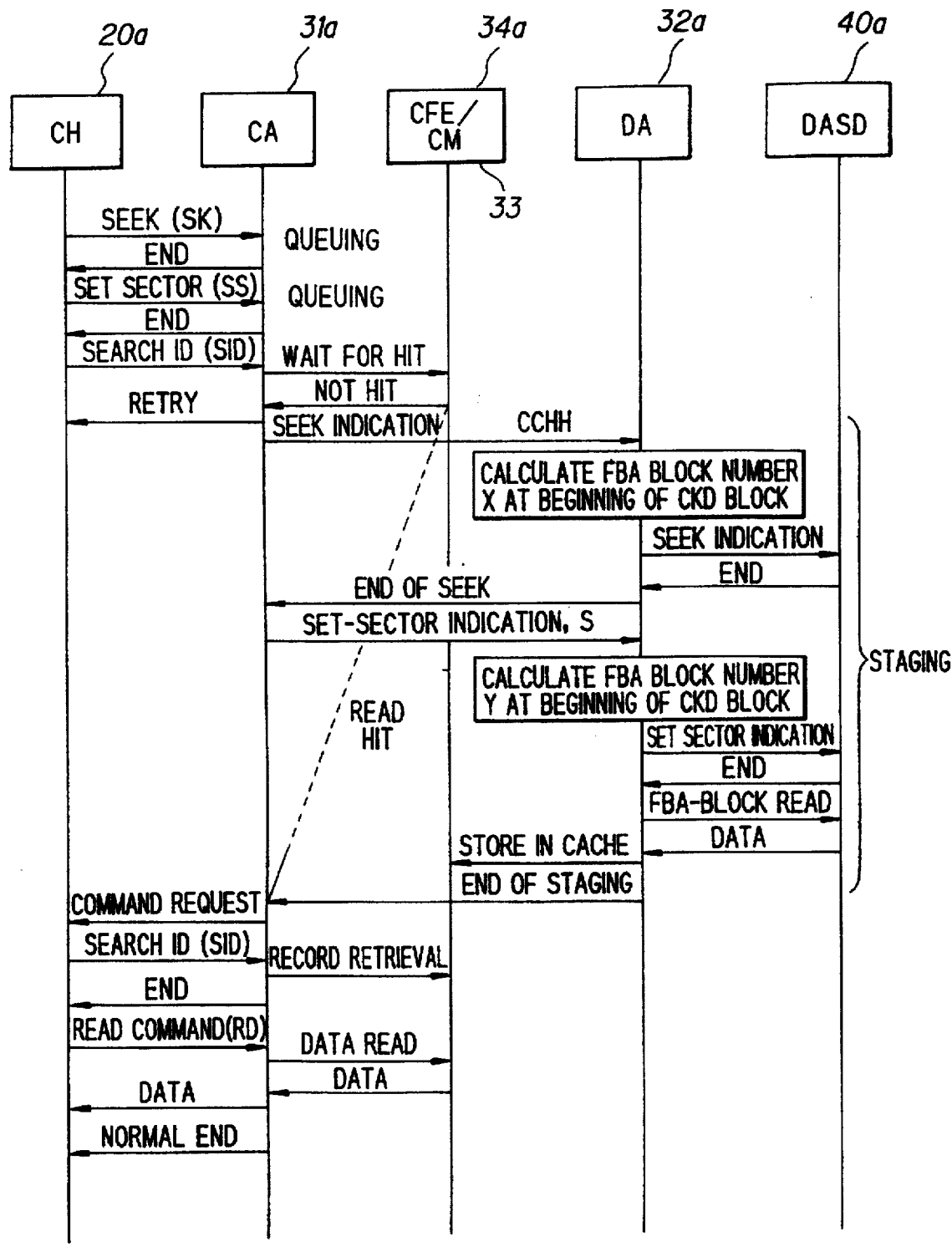
FIG. 15 is a diagram for describing a data reading procedure.

FIG. 15 is a diagram for describing the reading of data according to the present invention.

When the seek command SK is generated by the channel device 20a, the channel adapter 31a queues the seek command in a command queue and subsequently sends an operation-finished signal back to the channel device 20a to make it appear that the seek operation has ended. The channel device 20a issues the set-sector command SS in response to reception of the seek operation-finished signal. When this command is received, the channel adapter 31a queues the command and then sends an operation-finished signal back to the channel device 20a to make it appear that the set-sector operation has ended. The channel device 20a issues the search ID command SID in response to reception of the set-sector operation-finished signal. When this command is received, the channel adapter 31a inquires of the cache function engine 34a whether the record of the requested address (CCHHR) is present in the cache memory 33 (hit inquiry).

If the requested record is not present in the cache memory 33 (NOT HIT), then the channel adapter 31a notifies the resource manager 35a of this fact and issues a retry signal in order to cut off the channel device 20a from the disk control unit 30. The resource manager 35a refers to an exclusive control table ECT, which has been stored in the internal table store, to verify that the direct-access storage device 40a sought is not in the process of being accessed, determines the prescribed device adapter 32a, notifies the channel adapter 31a of the identification data of this device adapter and notifies this device adapter 32a of the identification data of the channel adapter 31a.

The channel adapter 31a delivers the CKD track position (CCHH) contained in the seek command to the notified device adapter 32a and commands a seek operation. Upon receiving the seek command, the device adapter 32a calculates the number X of the head FBA block of the CKD track CCHH in accordance with the following equation:

$$X=[(M-1)\cdot(\text{number of heads})+N]\cdot B \qquad (1)$$

where M=CC, N=HH and B is the number of FBA blocks contained in one CKD track.

If the number of the head FBA block is obtained, the device adapter 32a commands the direct-access disk device 40a via an SCSI interface to perform a seek operation for positioning the head at the head block H.

If a positioning-complete signal in response to the seek command is received from the direct-access disk device 40a, the device adapter 32a so notifies the channel adapter 31a. As a result, the channel adapter 31a delivers the sector value (S) contained in the set-sector command to the device adapter 32a and commands the set-sector operation. Upon receiving the set-sector command, the device adapter 32a calculates the number Y of the head FBA block, which has been stored in the designated sector, in accordance with the following equations:

$$y=S\cdot(\text{byte length of one sector})/\text{byte length of one FBA} \qquad (2)$$

where y represents the number of FBA blocks from the beginning of the track; and $$Y=X+[y] \qquad (3)$$

where [y] represents a whole number obtained by raising fractions.

Next, the device adapter 32a commands the direct-access disk device 40a to perform the processing for reading the FBA block of block number Y via an SCSI interface. If a positioning-complete signal in response to the set-sector command is received from the direct-access disk device 40a, the device adapter 32a instructs the direct-access disk device 40a to read one CKD block of data (e.g., up to a block which contains EOT) and writes the read FBA block in the cache memory 33 (staging; see FIG. 15). At this time, the address CCHHR of the record that has been recorded in the ID portion of each FBA block is stored in the internal memory of the cache function engine 34a.

If writing in the cache memory 33 has been concluded, the device adapter 32a notifies the channel adapter 31a of the end of staging. As a result, the channel adapter 31a sends a command request signal to the channel device 20a. Upon receiving the command request, the channel device 20a reissues the search ID command SID issued last. If the channel adapter 31a receives the search ID command SID, it retrieves the designated record in the cache memory 33 by referring to the ID information (record number and pointer) of the FBA block and sends the search ID operation-finished signal to the channel device 20a in response to end of retrieval. If the channel device 31a receives the search ID operation-finished signal, it issues the read command RD. If the channel adapter 31a receives the read command RD, it reads the searched record out of the cache memory 33 and transfers this record to the channel device 20a. When the transfer operation is finished, the channel adapter 31a gives notification of status indicating normal end of operation.

If, on the other hand, the record requested by the search ID is present in the cache memory 33 (read hit), the channel adapter 31a sends a command request signal to the channel device 20a. Upon receiving the command request, the channel device 20a reissues the search ID command SID issued last. If the search ID command SID is received, the channel adapter 31a retrieves the designated record in the cache memory 33 by referring to the ID information and sends the search ID operation finished signal to the channel device 20a in response to end of retrieval. If the channel device 20a receives the search ID operation-finished signal, it issues the read command RD. If the channel adapter 31a receives the read command RD, it reads the requested record out of the cache memory 33, transfers it to the channel device CH and gives notification of status indicating normal end of operation following the conclusion of the transfer operation.

(b-4) Writing of data

Figure 16:
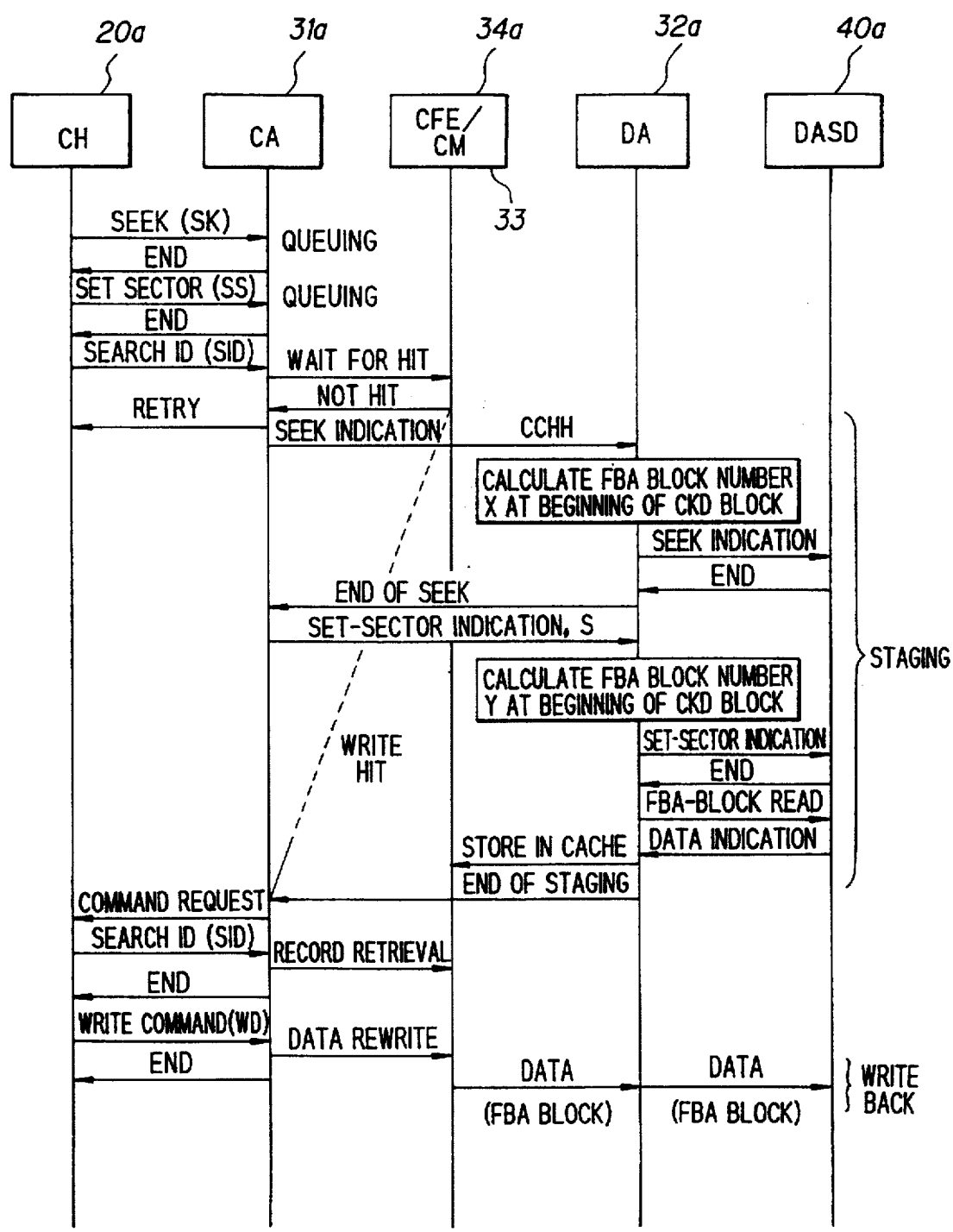
FIG. 16 is a diagram for describing a data rewrite procedure.

FIG. 16 is a diagram for describing a procedure for rewriting data according to the present invention.

When the seek command SK is generated by the channel device 20a, the channel adapter 31a queues the seek command in a command queue and subsequently sends an operation-finished signal back to the channel device 20a to make it appear that the seek operation has ended. The channel device 20a issues the set-sector command SS in response to reception of the seek operation-finished signal. When this command is received, the channel adapter 31a queues the command and then sends an operation-finished signal back to the channel device 20a to make it appear that the set-sector operation has ended. The channel device 20a issues the search ID command SID in response to reception of the set-sector operation-finished signal. When this command is received, the channel adapter 31a inquires of the cache function engine 34a whether the record of the requested address (CCHHR) is present in the cache memory 33 (hit inquiry).

If the requested record is not present in the cache memory 33, then the channel adapter 31a notifies the resource manager 35a of this fact and issues a retry signal in order to cut off the channel device 20a from the disk control unit 30. This is followed by staging processing similar to that of FIG. 15.

If staging is concluded, the device adapter 32a notifies the channel adapter 31a of the end of staging. As a result, the channel adapter 31a sends a command request signal to the channel device 20a. Upon receiving the command request signal, the channel device 20a reissues the search ID command signal SID issued last. If the channel adapter 31a receives the search ID command signal SID, it retrieves the designated record in the cache memory 33 by referring to the ID information and sends the search ID operation-end signal to the channel device 20a in response to end of retrieval.

If the channel device 20a receives the search ID command signal SID, it issues the write command WD. Upon receiving the command request, the channel device CH issues the write command WD. Upon receiving the write command WD, the channel adapter 31a rewrites the searched record directly as a record accompanying the write command and notifies the channel device of the normal-end status following the rewriting operation. Further, the cache function engine CFE makes "1" the flag corresponding to the address CCHHR of the rewritten record. In concurrence with the foregoing, the write record is written in the non-volatile memory (NVS) (not shown) incorporated within the disk control unit 30. This is to prevent the content of the cache memory 33 from being erased for some reason before it is saved in the direct-access disk device 40a.

Thereafter, independently of the operation of the host, the device adapter 32a reads the FBA block containing the record of CCHHR for which the flag is "1" from the cache memory 33, transfers the block to the direct-access storage device 40a and writes the block at the prescribed position (this is "write-back"). In this case, the cache function engine 34a makes the flag of the record address CHHR "0".

If, on the other hand, the record requested by the search ID is present in the cache memory 33 (write hit), the channel adapter 31a sends a command request signal to the channel device 20a. Upon receiving the command request, the channel device 20a reissues the search ID command SID issued last. If the channel adapter 31a receives the search ID command SID, it retrieves the designated record in the cache memory 33 by referring to the ID information of the FBA block and sends the search ID operation-end signal to the channel device 20a in response to the end of retrieval. If the channel device 20a receives the search ID end-operation signal, it issues the write command WD. From this point onward rewrite processing is executed in the same manner as set forth above.

If the arrangement described above is adopted, positioning control and data-retrieval control with regard to the seek command, set-record command and search ID command can be executed in the same manner as in the case of the CKD disk device even if the device is the FBA disk device.

(c) Second embodiment of the invention

According to the first embodiment, it has been described that the device adapter reads one CKD track of FBA blocks 1~n out of an FBA disk device and develops the blocks in the cache memory, after which the channel adapter retrieves the desired record from the cache memory and transfers the record to the channel device. However, a serial data transfer of this kind exhibits a long response time. Accordingly, a second embodiment of the invention is so adapted that the writing of FBA blocks to the cache memory and the reading of data from the cache memory are executed in parallel fashion.

Figure 17:
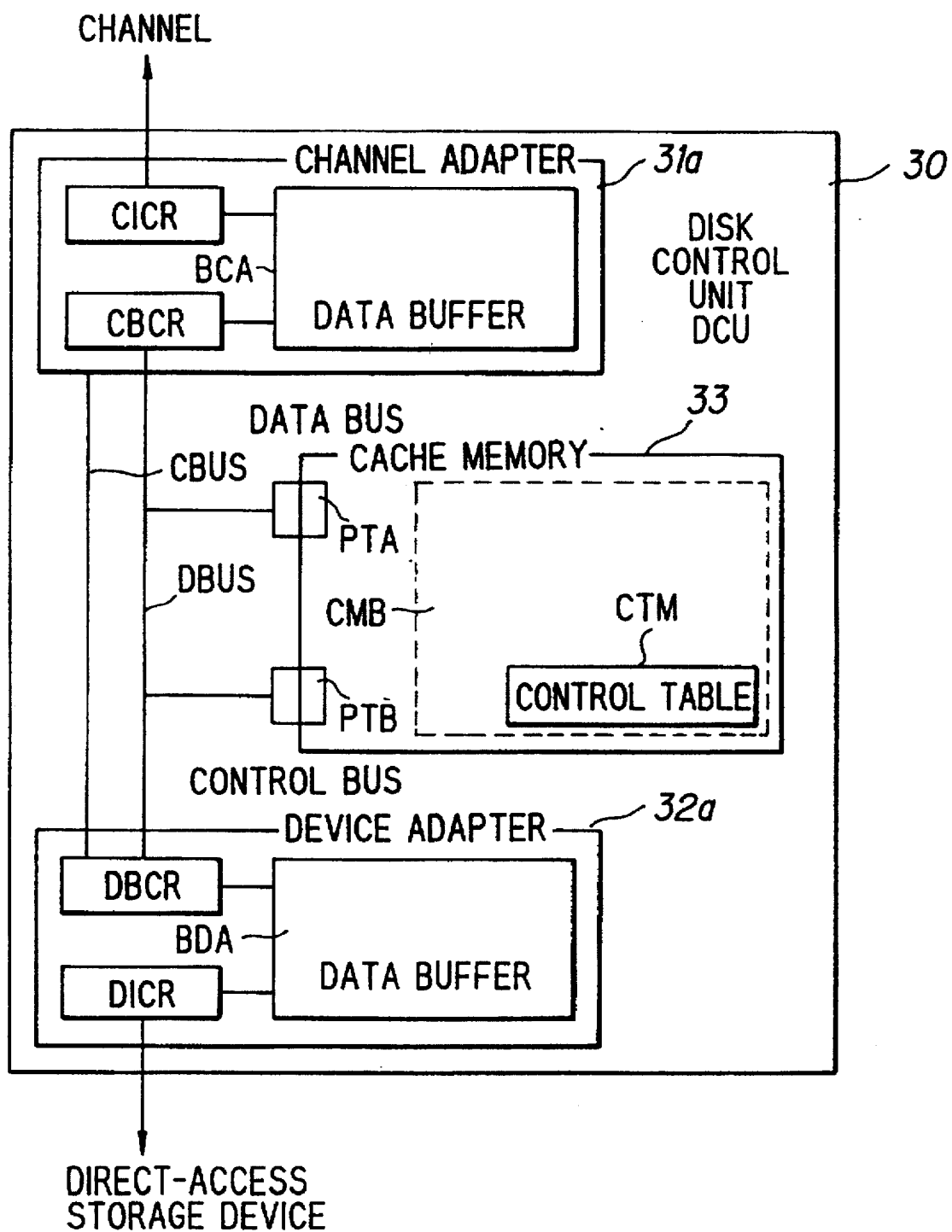
FIG. 17 is a block diagram showing the principal components of a second embodiment of the invention.

FIG. 17 is a block diagram illustrating the principal components of a second embodiment according to the present invention. Here the disk control unit 30 includes the channel adapter 31a, the device adapter 32a, a control bus CBUS and a data bus DBUS. The channel adapter 31a has a data sending/receiving register CICR for when data is transferred between the disk control unit and a channel, a data sending/receiving register CBCR for when data is transferred via a bus, and a data buffer BCA of the channel adapter. The device adapter 32a has a data sending/receiving register DICR for when data is transferred between the disk control unit and an FBA disk device, a data sending/receiving register DBCR for when data is transferred via a bus, and a data buffer BDA of the device adapter. The cache memory 33 includes a plurality of memory access ports PTA, PTB, a control table CTM and a main body CMB of the cache memory. The cache memory 33 is equipped with the plurality of access ports PTA, PTB in the manner of a dual-port RAM and is capable of writing and reading data simultaneously via these ports.

The device adapter 32a reads one CKD track of the FBA blocks from the direct-access storage device 40a in response to the read command READ, stores these blocks in the data buffer BDA, and develops the blocks in the cache memory 33 one FBA block or plural FBA blocks at a time from the data buffer. Whenever one FBA block or plural FBA blocks of data are stored in the cache memory, the device adapter writes the fact that storage is complete in the control table CTM provided in the cache memory. The channel adapter 31a refers to the control table CTM to discriminate the completion of writing of one FBA block or plural FBA blocks. Whenever the writing of one FBA block or plural FBA blocks in the cache memory 33 is completed, the channel adapter 31a refers to the ID portion at the head of the FBA block to perform a search and determine whether the record designated by the host apparatus is present in the cache memory 33. If the record is present in the cache memory, then the channel adapter 31a reads the record out of the cache memory 33 and transfers it to the host apparatus.

Figure 18:
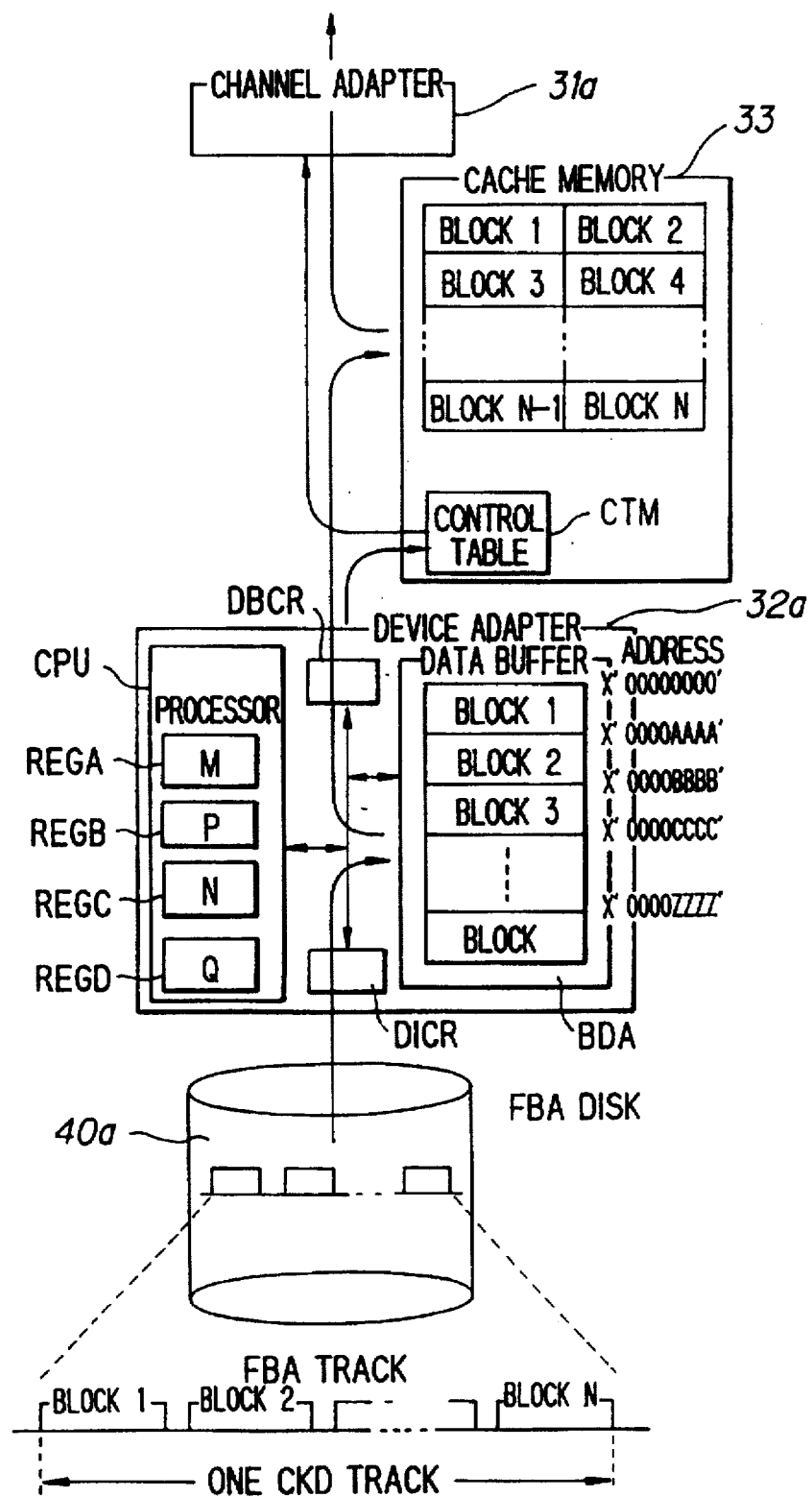
FIG. 18 is a diagram showing an arrangement for describing the operation of the second embodiment.

FIG. 18 is a diagram showing an arrangement for describing the operation of the second embodiment of the invention. Portions identical with those shown in FIG. 17 are designated by like reference characters. CPU is a processor equipped with registers REGA~REGD.

The number M of data words (the number of words of one FBA block) transferred to the cache memory 33 is stored in the register REGA and decremented by one whenever one word of data is transferred from the data buffer BDA to the cache memory 33, and the register is reset to M when the count reaches zero. A pointer P indicating the address of the data buffer BDA at which data to be transferred to the cache memory 33 has been stored is stored in the register REGB and is updated so as to point to the next address whenever one word is transferred. The number N of data words of one CKD block stored in the data buffer BDA is stored in the register REGC and decremented whenever one word of data is stored in the data buffer BDA. A pointer Q indicating the address of the data buffer BDA at which data read from the FBA disk 40a is to be stored is stored in the register REGD and is updated so as to point to the next address whenever one word is stored.

Figure 19:
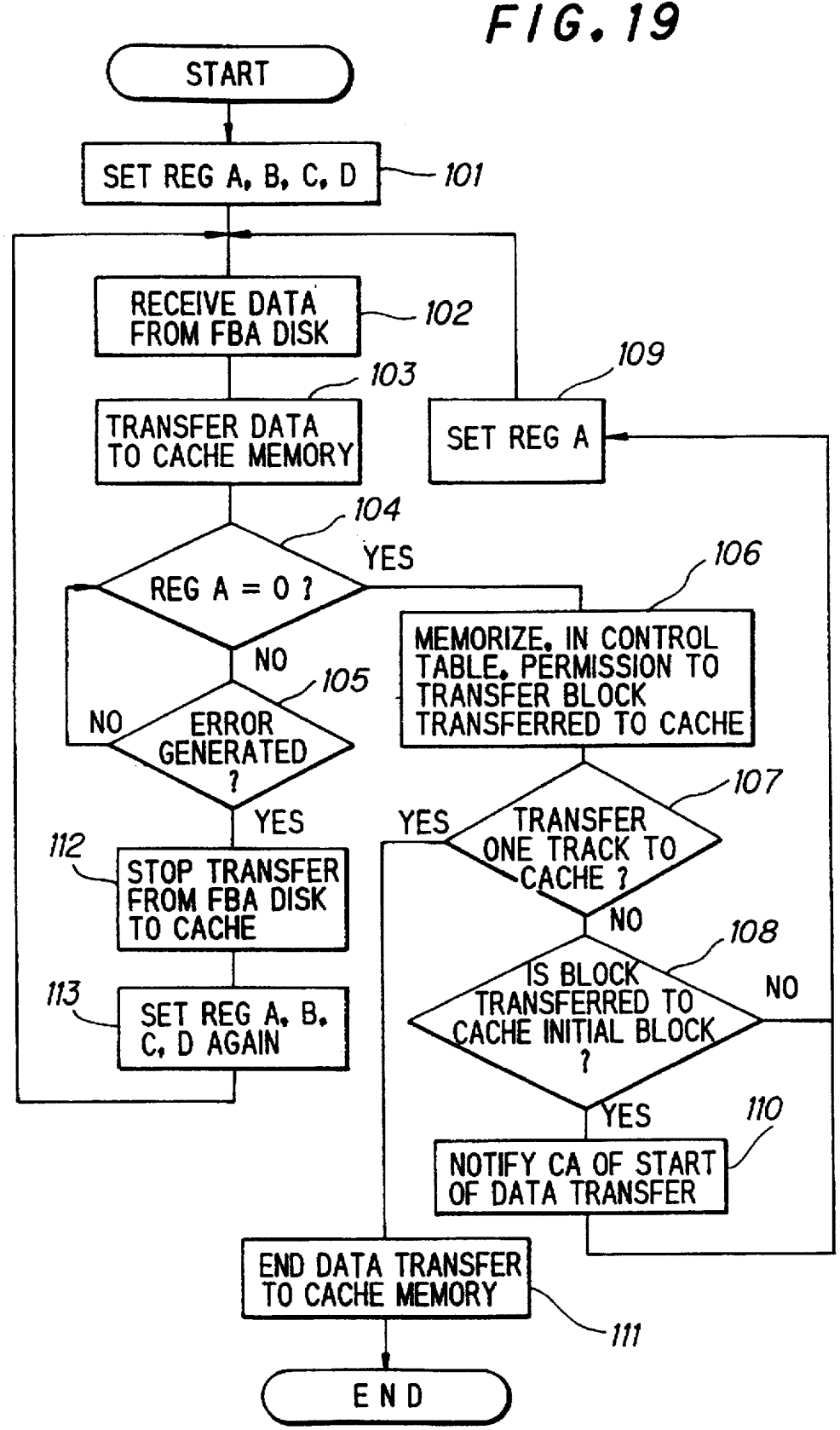
FIG. 19 is a flowchart showing processing for FBA block transfer by a device adapter.
Figure 20:
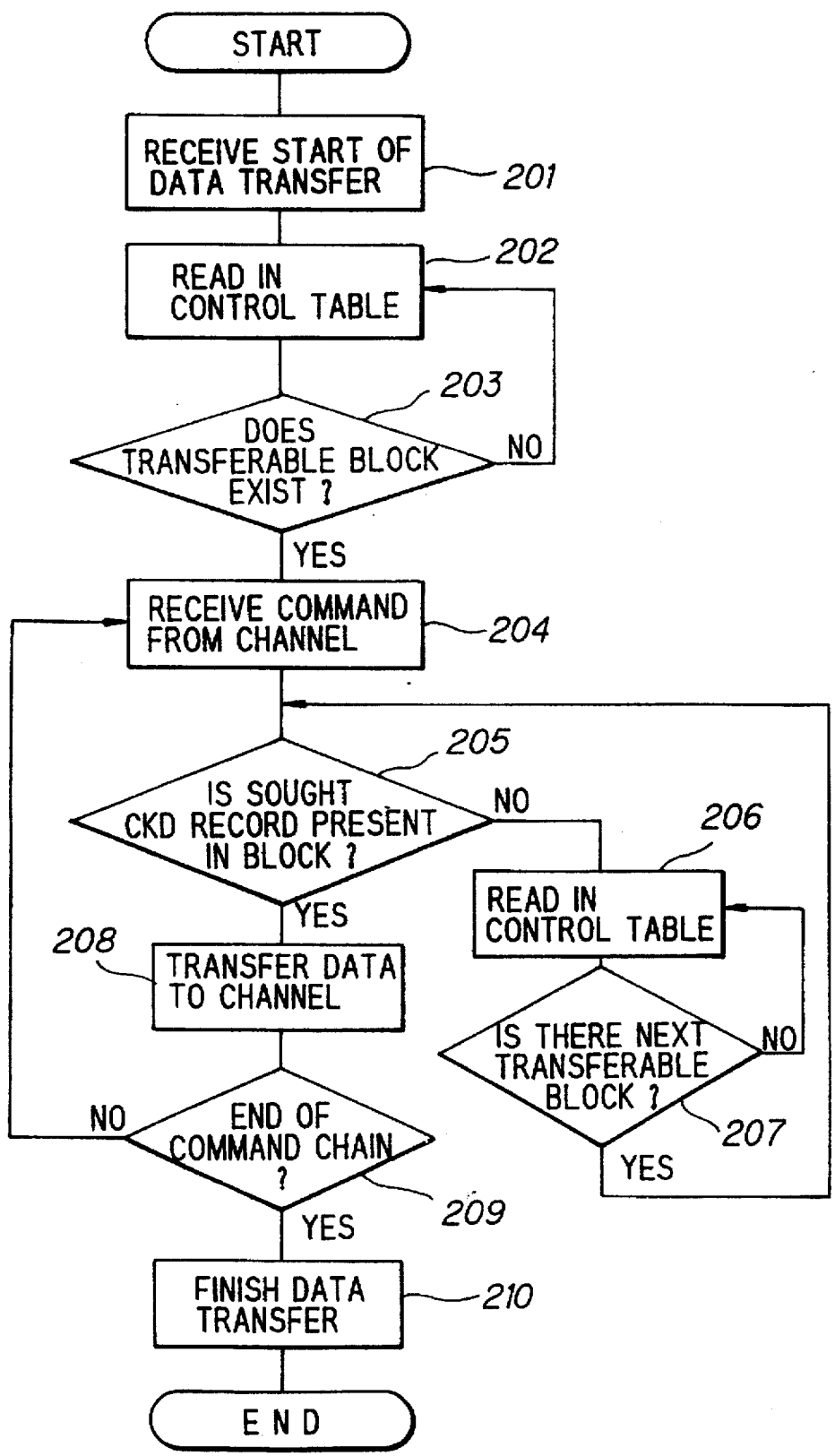
FIG. 20 is a flowchart showing processing for reading a record by a channel adapter.

FIG. 19 is a flowchart showing processing for FBA block transfer by the device adapter 32a, and FIG. 20 is a flowchart showing processing for reading a record by the channel adapter 31a.

Before receiving data from the FBA disk device 40a, the device adapter 32a sets M, P, N, Q in the registers REGA, REGB, REGC, REGD, respectively (step 101). The device adapter 32a then stores the data of the FBA blocks 1~n received from the FBA disk device 40a in the data buffer BDA consecutively, increments Q and counts down N whenever one word is stored (step 102). Writing of the data in the data buffer BDA is performed until N=0 is attained.

In concurrence with the foregoing operation, the device adapter 32a transfers one FBA block of data from the data buffer BDA to the cache memory 33 one word at a time, counts down M and increments P (step 103). The device adapter 32a then determines whether the count M in the register REGA has become zero or not (step 104). If the answer is "NO", then it is determined whether an error has occurred (step 105).

If M=0 holds without the occurrence of an error, or, in other words, if transfer of the initial one FBA block of data to the cache memory 33 has been completed, then the device adapter 32a sets permission to transfer the just transferred first FBA block to the host apparatus in the control table CTM (step 106). It should be noted that the numerical order B (number from the beginning of one CKD track) of the FBA block stored in the cache memory 33 is stored in the control table CRM as "transfer permission".

Next, the device adapter determines whether all of the data of one CKD track has been transferred to the cache memory 33 (step 107). If the answer is "NO", then it is determined whether what has been transferred to the cache memory is the initial block (B=1) (step 108). If it is not the initial block, then the device adapter immediately sets the number M or words of one FBA block in the register REGA (step 109). If, on the other hand, the initial block has been transferred to the cache memory, then the device adapter notifies the channel adapter 31a of the fact that transfer of data to the cache memory 33 has started (step 110) and sets the number M of words of one FBA block in the register REGA (step 109). The device adapter thenceforth returns to step 102 and repeats the processing from step 102 onward. That is, the device adapter transfers the second block to the cache memory 33, sets the transfer permission (B=2) for the second block in the control table CTM at the end of transfer and starts to transfer the third block to the cache memory 33.

The above-described control is executed until all blocks accepted from the FBA disk device 40a have been transferred to the cache memory 33. Transfer processing is terminated in response to the conclusion of transfer of all blocks to the cache memory (step 111).

If occurrence of an error is detected at step 105, data transfer is halted (step 112). This error is an error detected when a transfer is made from the FBA disk 40a to the device adapter 32a. An error occurs (1) when the FBA disk device 40a has detected a data-check error related to block transfer, or (2) when the device adapter 32a has detected a parity error at acceptance of the block.

Assume that an error is detected when the third FBA block is being received from the FBA disk device 40a.

The device adapter 32a again sets the initial values M, N, Q in the respective registers REGA, REGC, REGD and again accepts the data from the FBA disk device 40a (step 102). At this time the data is transferred to the FBA disk device 40a not from the third block (B=3) but from the first block (B=1), namely from the beginning of data requested by the device adapter 32a.

In order to suppress re-transfer of a block that has already been transferred to the cache memory 33, the device adapter 32a sets, in the register REGB, the starting address X'0000BBBB' of the third block in the data buffer BDA. As a result, data is transferred from the FBA disk device 40 to the data buffer BDA and stored starting from the first block. However, the data transfer from the data buffer BDA to the cache memory 33 is performed from the third block, namely from the block which prevailed when the error was detected.

When the channel adapter 31a receives the notification of the start of data transfer to the cache memory at step 110 (step 201 in FIG. 20), the channel adapter 31a reads in the control table CTM (step 202) and determines whether a block capable of being transferred is present in the table (step 203). For example, the channel adapter 31a has an initial value 0 as a block number b. Accordingly, the channel adapter 31a compares the block number b which it possesses with the block number B that has been stored in the control table CTS and decides that there is a transferable block when b<B holds. If there is no transferable block, then the program jumps to step 202, at which storage of the transferable block to the cache memory 33 is monitored.

If a transferable block exists, then the channel adapter 31a performs the operation b+1→b and receives a command (e.g., a read command) from a channel (step 204). Next, the channel adapter 31a determines whether the sought CKD record is present in the block transferred to the cache memory 33 (step 205). If the answer is "NO", then the channel adapter reads in the control table CTM (step 206) to determine whether a transferable block is present (step 207). If the answer is "NO", then the channel adapter repeats the processing from step 206 onward to monitor storage of a transferable block in the cache memory 33. If a transferable block has been written in the cache memory 33, then the program jumps to step 205 to determine whether the sought record is present. If the record is not present, then the channel adapter repeats processing from step 206 onward. If the record exists, the record is transferred to the host apparatus (step 208).

Next, the channel adapter determines whether the command chain has ended (step 209). If the answer is "N", the next command is received from the channel and subsequent processing is repeated. If the command chains has ended, the channel adapter terminates data transfer processing (step 210).

Figure 21:
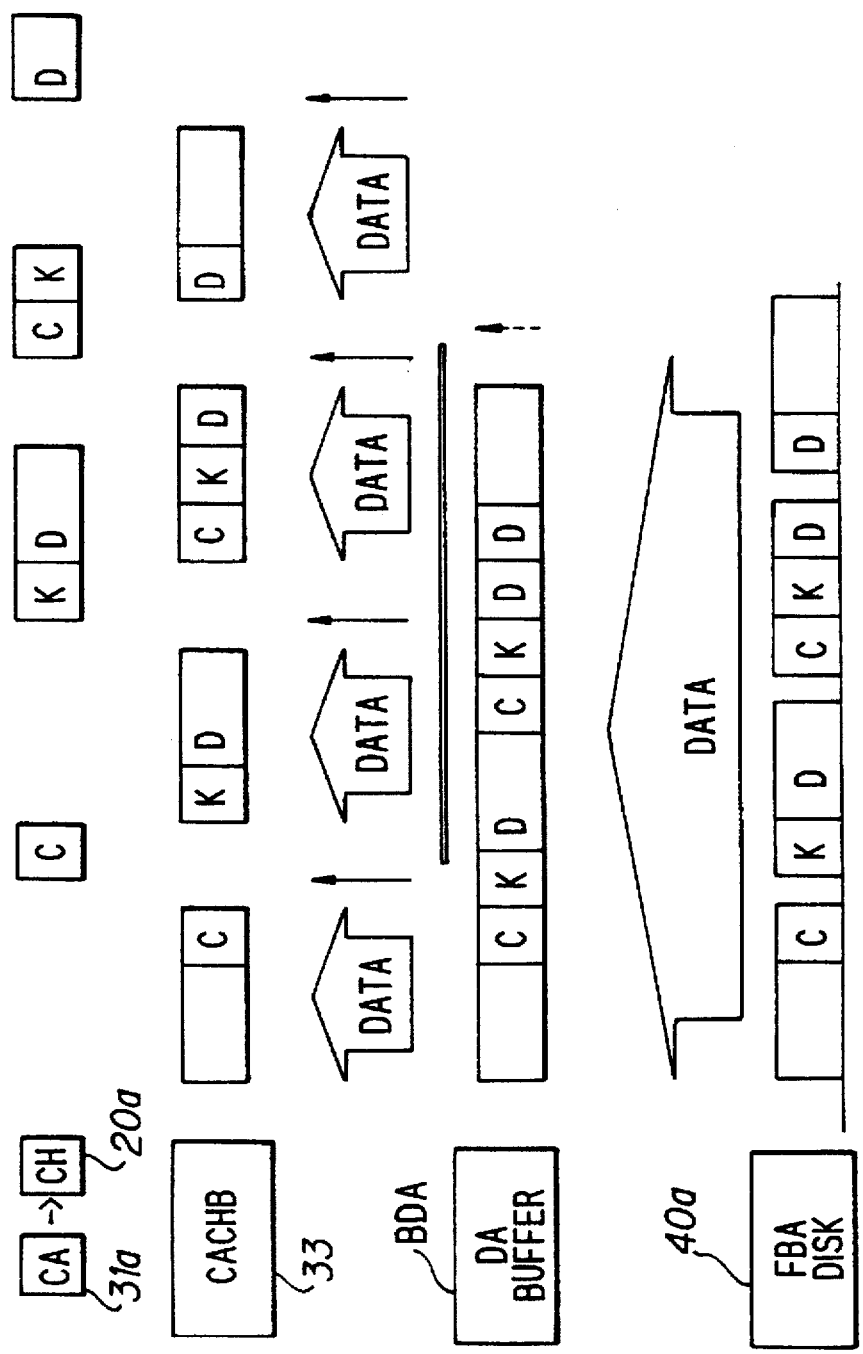
FIG. 21 is a diagram for describing data transfer timing.

FIG. 21 is a diagram for describing the timing of data transfer according to the second embodiment of the invention. ① One CKD track of FBA blocks is transferred en masse from the FBA disk device 40a to the data buffer BD of the device adapter 32a. ② Further, FBA blocks are transferred from the data buffer BDA to the cache memory 33 one block at a time. ③ In concurrence with the foregoing, the channel adapter 31a reads the relevant CKD record from the cache memory 33 and transfers it to the channel.

Since writing to and reading from the cache memory are performed simultaneously, response time can be shortened. In FIG. 21, the dashed-line arrow is the time at which transfer to the cache memory 33 starts in the prior art. It will be understood that response is considerably slower than in the second embodiment. Further, since data is stored in the cache memory 33 in a form demarcated every FBA block as shown in FIG. 21, it is unnecessary to transfer all data to the cache memory and store it there from the start even if an error occurs. In other words, data need be transferred only from the block in which the error occurred. This makes possible effective bus utilization.

(d) Third embodiment of the invention

The cache memory 33 is backed up by battery at the time of power cut-off in such a manner that the stored data will not be lost before the data is saved in the direct-access storage device. If the battery runs out, the high-speed write mode employing the cache memory can no longer be utilized when power is introduced. By backing up the cache memory using a battery only when truly necessary rather than unconditionally, consumption of the battery can be inhibited and it will be possible to utilize the high-speed write mode employing the cache memory the moment power is introduced.

Figure 22:
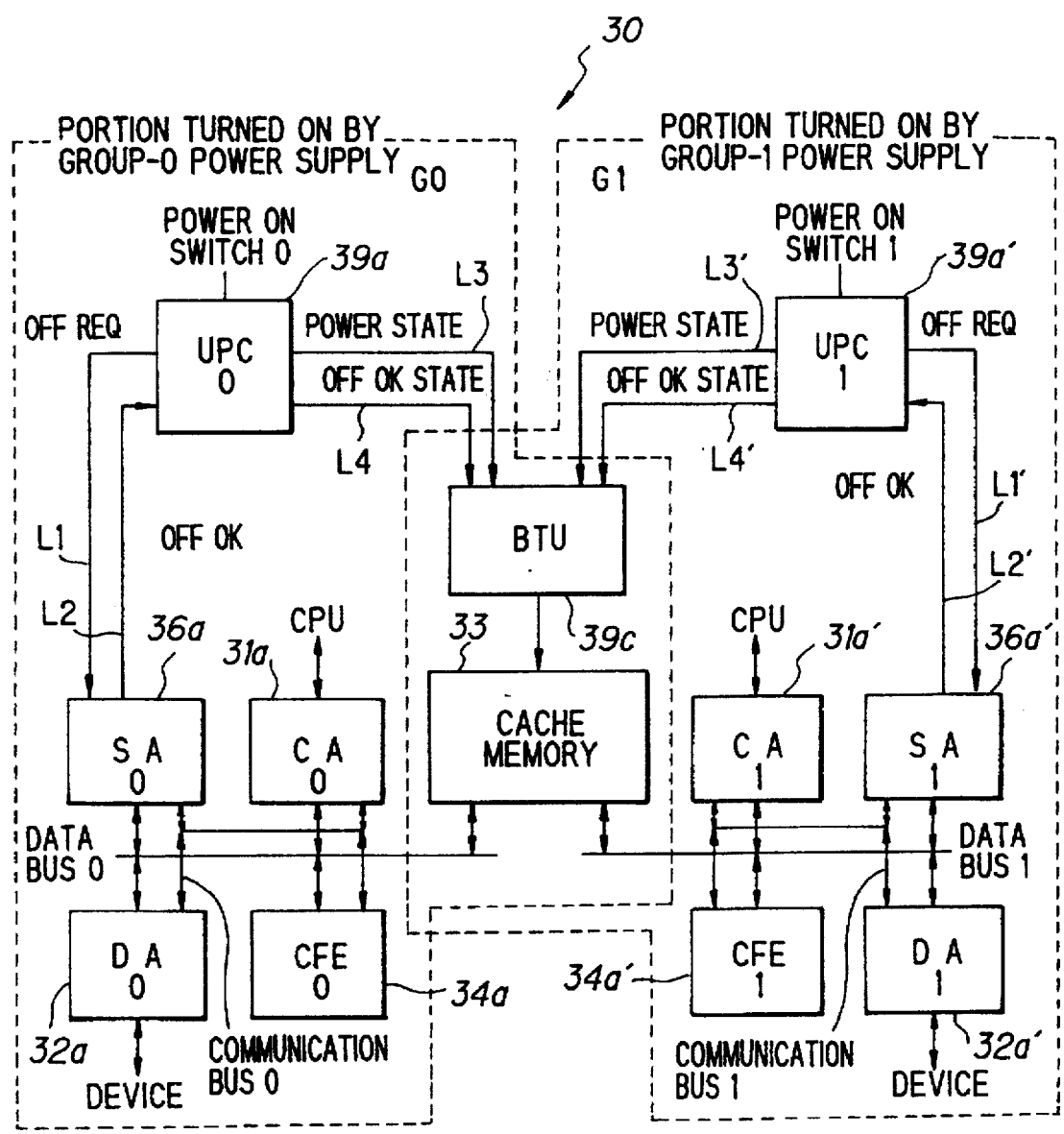
FIG. 22 is a block diagram showing a third embodiment of the invention.

FIG. 22 is a block diagram showing a third embodiment of the invention. Numeral 30 denotes the disk control unit, which has a redundant construction comprising Group 0 and Group 1. The disk control unit 30 includes the channel adapters (CA) 31a, 31a' for interfacing the host apparatus, the device adapters (DA) 32a, 32a' for interfacing the direct-access storage devices, the cache memory 33 shared by both groups, the cache function engines (CFE) 34a, 34a' for managing the cache memory and executing processing such as a hit/miss decision, and the service adapters (SA) 36a, 36a' for executing IML (initial microprogram loading), status monitoring processing and malfunction recovery processing with regard to each of the units. These units are interconnected by a data bus and communication bus. The cache function engines 34a, 34a' are capable of informing the service adapters 36a, 36a' of whether all of the data in the cache memory could or could not undergo write-back. Further, the cache function engines 34a, 34a' are capable of informing the service adapters 36a, 36a' of whether or not there is valid data in the cache memory.

Numerals 39a, 39a' denote the unit power controllers (UPC), and number 39c designates the battery unit (BTU) for battery back-up of the cache memory 33. Each group is provided with a power-supply switch so that power can be supplied to the unit having the switch and to the shared units (cache memory, etc.). Though not shown, each group is equipped with a resource manager (RM) for performing control related to overall resource management and processing operations, and a non-volatile memory for storing the microprograms of the respective unites.

Figure 4:
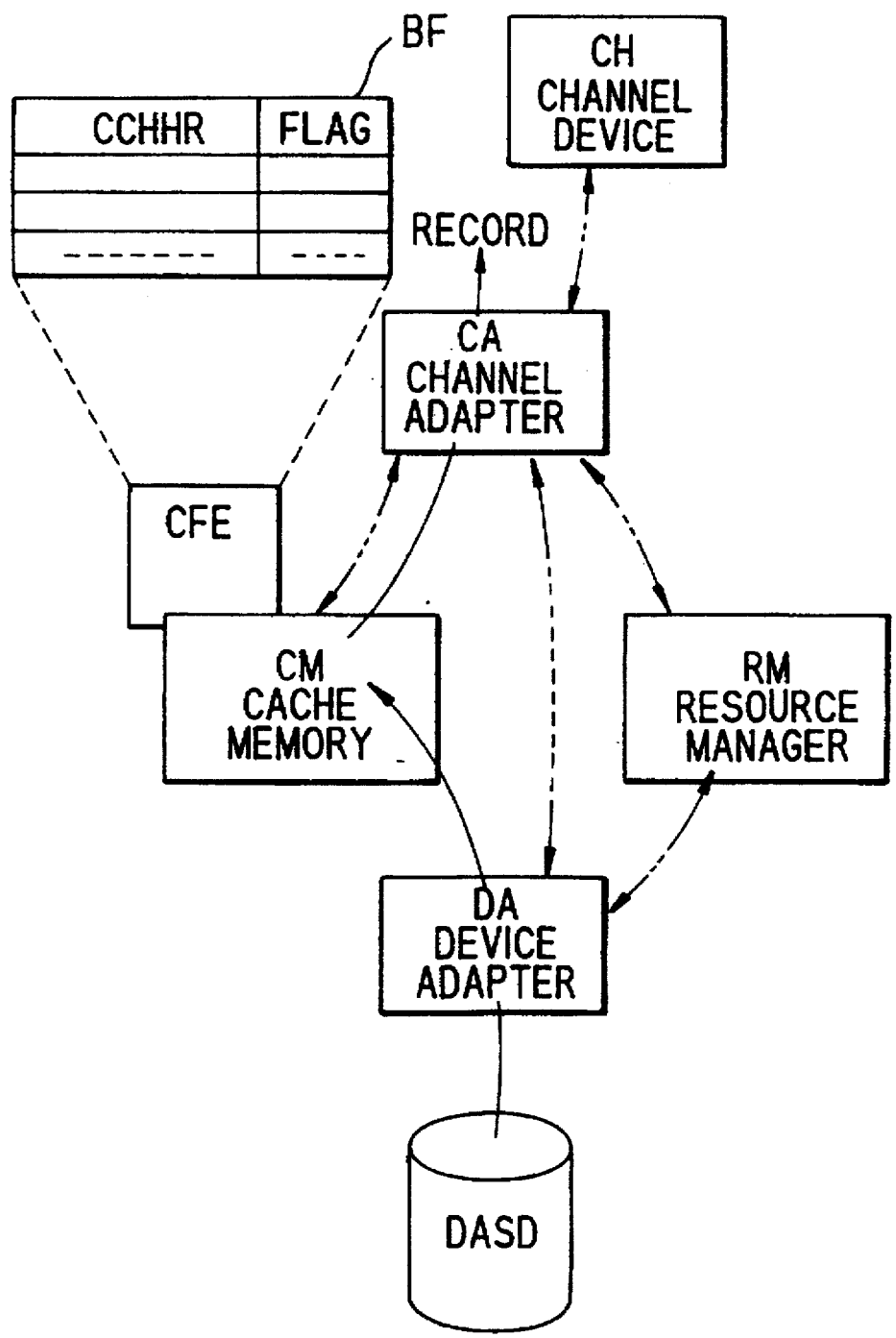
FIG. 4 is a diagram for describing reading of data (in a case where a read hit is not achieved) according to the prior art.
Figure 5:
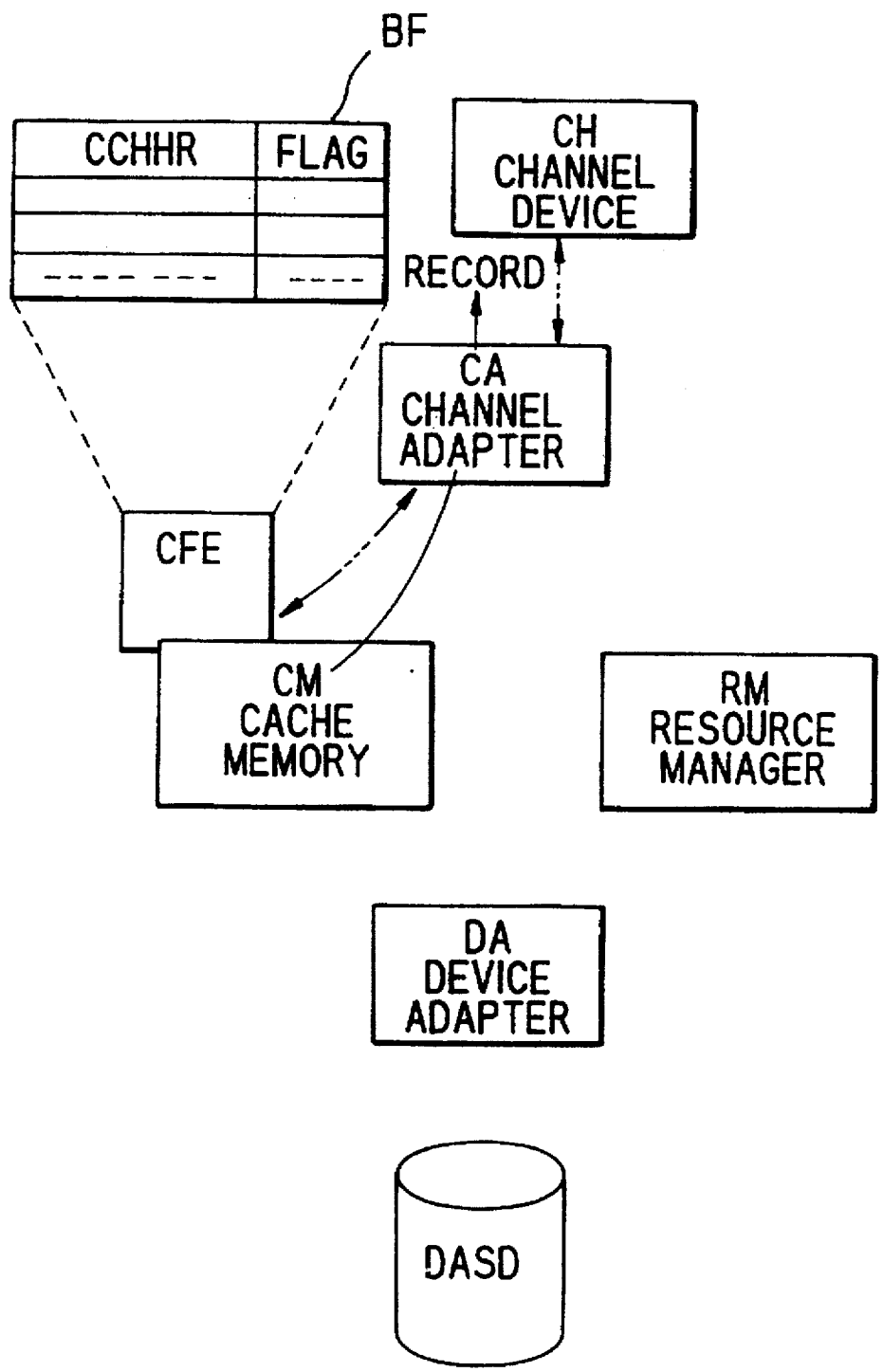
FIG. 5 is a diagram for describing reading of data (in case of a read hit) according to the prior art.
Figure 6:
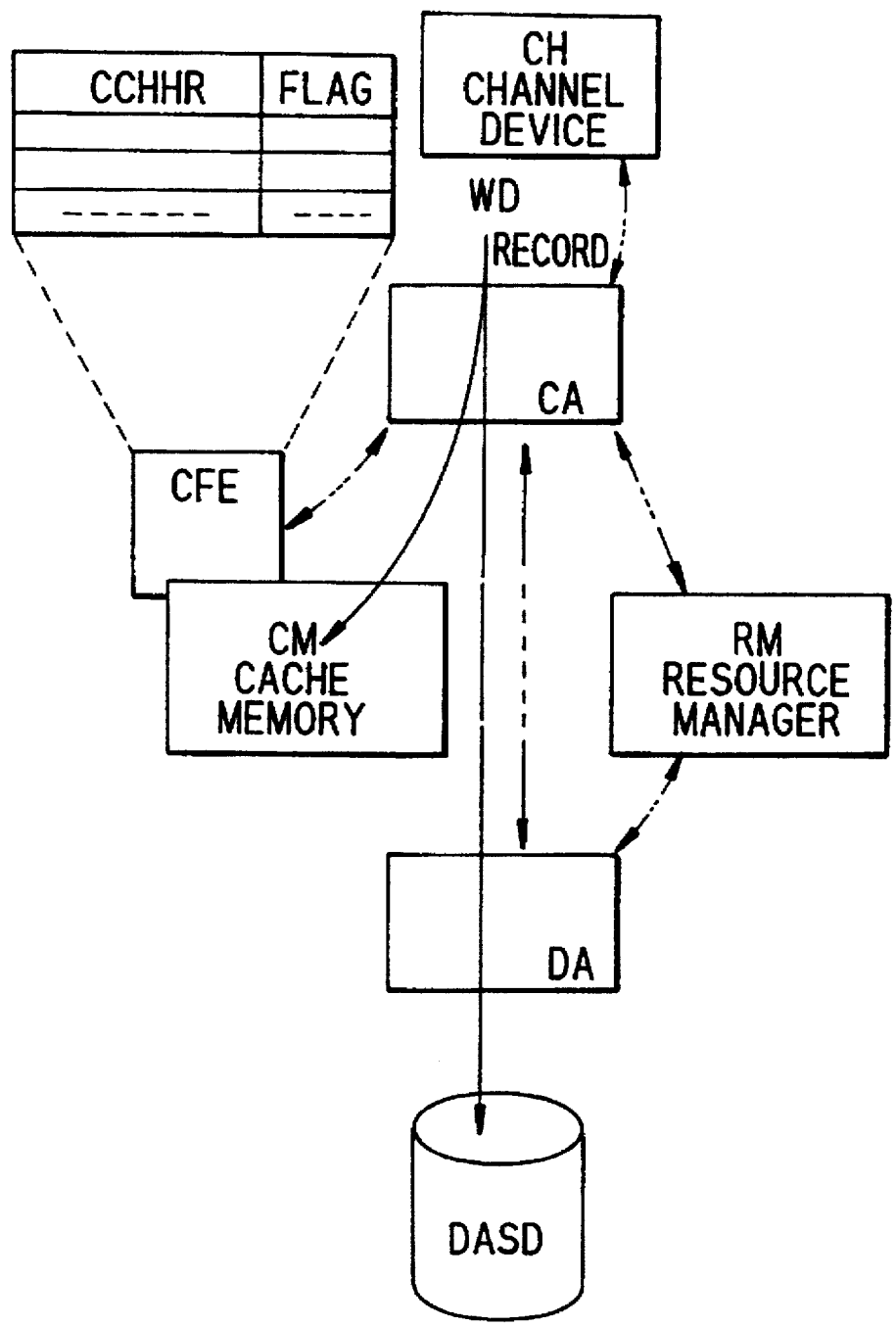
FIG. 6 is a diagram for describing writing of data (in case of write-thru) according to the prior art.
Figure 7:
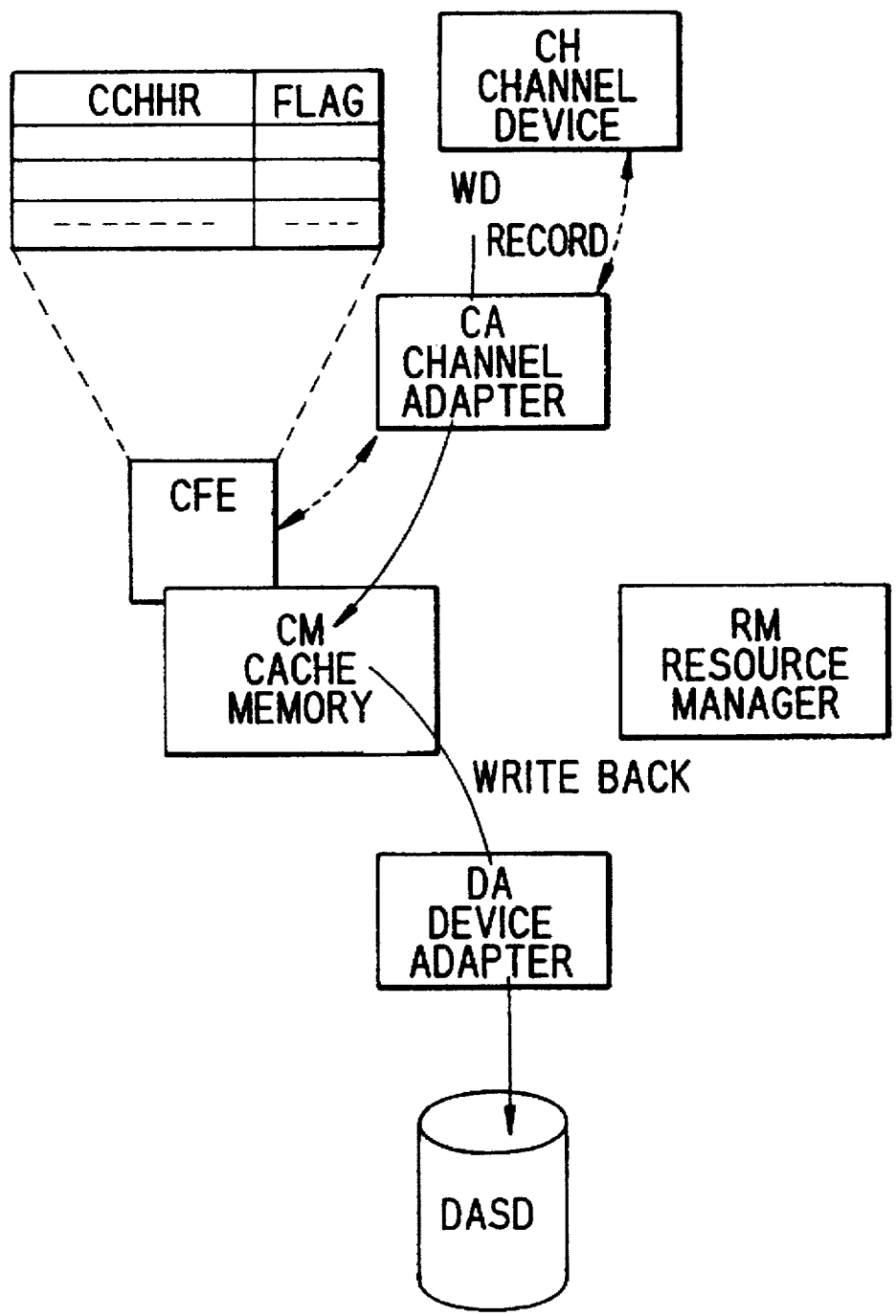
FIG. 7 is a diagram for describing writing of data (in case of write hit and write-back) according to the prior art.
Figure 8:
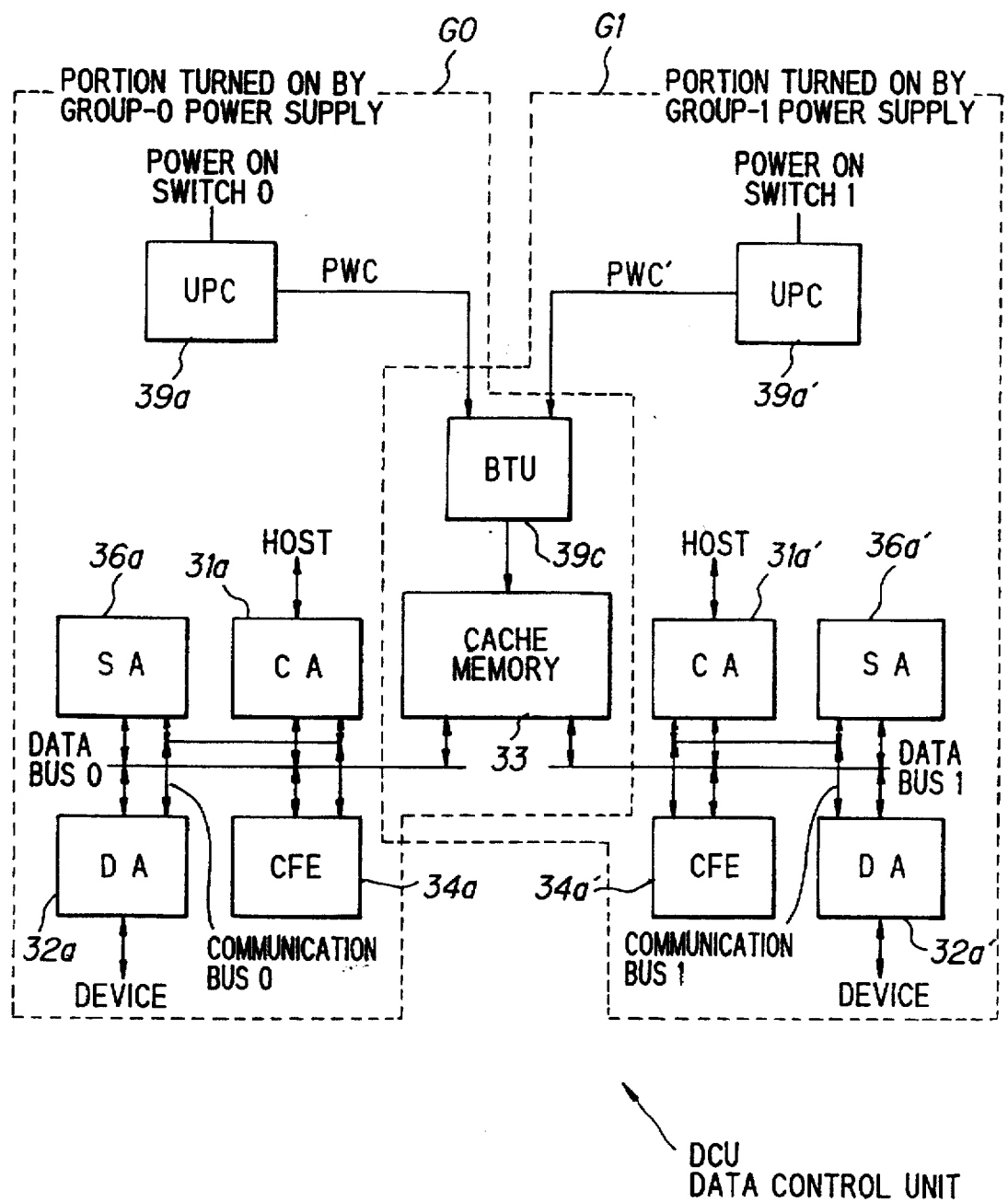
FIG. 8 is a diagram for describing battery back-up according to the prior art.
Figure 9:
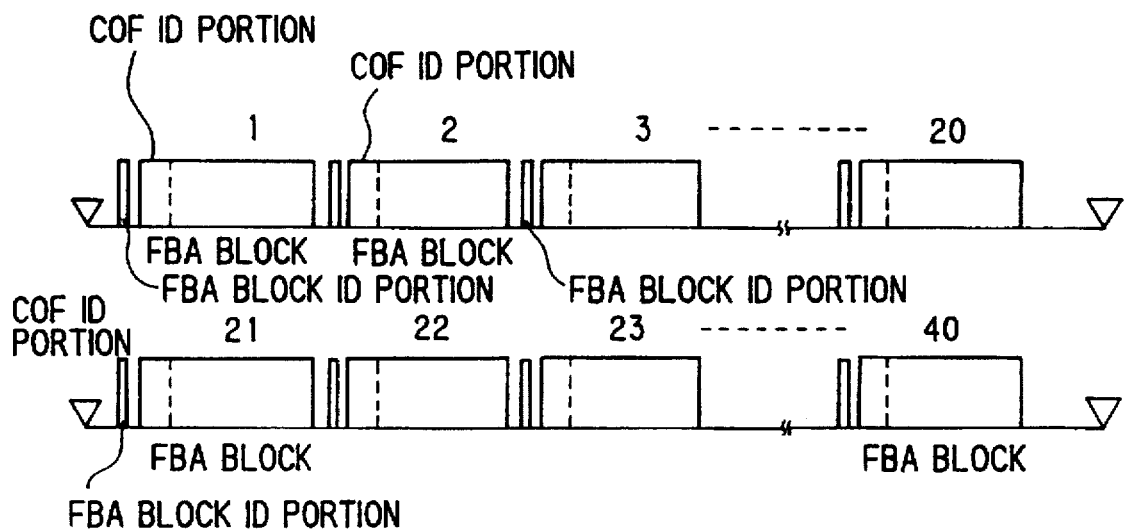
FIG. 9 is a diagram for describing an FBA format according to the prior art.
Figure 10:
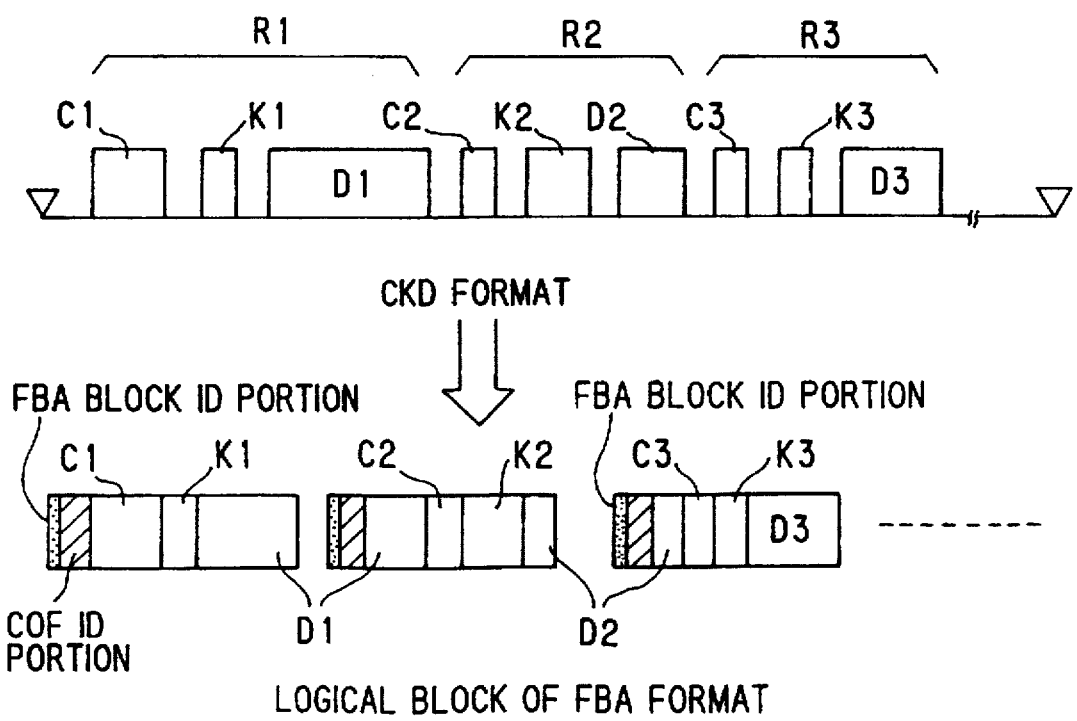
FIG. 10 is a diagram for describing a CKD.FBA format conversion.

The service adapters 36a, 36a' and unit power controllers 39a, 39a' of the respective groups are interconnected by signal lines L1, L2; L1', L2', respectively, so that the service adapters and unit power controllers are capable of exchanging an off-request signal OFF REQ and an off-permission signal OFF OK via the signal lines. When the unit power controllers 39a, 39a' sense cut-off of power, they send the off-request signal OFF REQ to the service adapters 36a, 36a', respectively, to inquire as to whether battery back-up should be performed. In response to the inquiry, the service adapters 36a, 36a' send the off-permission signal OFF OK to the respective unit power controllers 39a, 39a' in a case where notification of write-back completion has been received from the cache function engines 34a, 34a', thereby giving notice of the fact that battery back-up is unnecessary. If the notification of write-back completion has not been received, the service adapters 36a, 36a' do not send the off-permission signal OFF OK, thereby giving notice of the fact that battery back-up is necessary. When all records in the cache memory conforming to flag="1" in internal memories (see FIG. 4) of the cache function engines 34a, 34a' have been written back (saved) in the disk device, the cache function engines 34a, 34a' inform the service adapters 36a, 36a of the fact that write-back has been completed.

The unit power controllers 39a, 39a' and battery unit 39c are connected by signal lines L3, L4; L3', L4', respectively. The unit power controllers 39a, 39a' input the following to the battery unit 39c: ① a power-supply status signal POWER STATE indicating the on/off state of its own power supply, and ② an off-permission signal OFF OK STATE indicating whether notification of the fact that battery back-up is unnecessary has been received from the service adapters 36a, 36a'.

The battery unit 39c stores the power-supply status signal POWER STATE (on/off) and off-permission signal OFF OK STATE (on/off), as shown in FIG. 23, and decides the necessity (see the right-most column in FIG. 23) of battery back-up of the cache memory 33 based upon the on/off states of the two signals in each group.

Specifically, during cut-off of power (POWER STATE= OFF) in one group (e.g., Group 0), the battery unit 39c stores the ON/OFF state of the off-permission signal OFF OK STATE of this group. When the power supply of the other group (Group 1) is cut off (ON→OFF) under these conditions, the ON/OFF state of the off-permission signal OFF OK STATE of Group 1 is judged. In a case where the off-permission signal OFF OK STATE of Group 1 is ON (battery back-up unnecessary), the battery unit 39c judges the necessity of battery back-up of the cache memory based upon the ON/OFF state of the off-permission signal OFF OK STATE of Group 0. That is, in a case where the off-permission signal OFF OK STATE of Group 0 is ON (back-up unnecessary) (case ③ in FIG. 23), battery back-up is not carried out. In a case where OFF OK STATE of Group 0 is OFF (back-up necessary) (case ⑥), battery back-up is carried out. In a case where OFF OK STATE of Group 1 is OFF (back-up necessary) (cases ②, ⑤), battery back-up of cache memory 33 is carried out regardless of the ON/OFF state of the off-permission signal OFF OK STATE of Group 0.

In a case where the power supply is ON in either one of the groups (cases ①, ④), battery back-up is turned off regardless of the off-permission signal OFF OK STATE of both groups.

Figure 24:
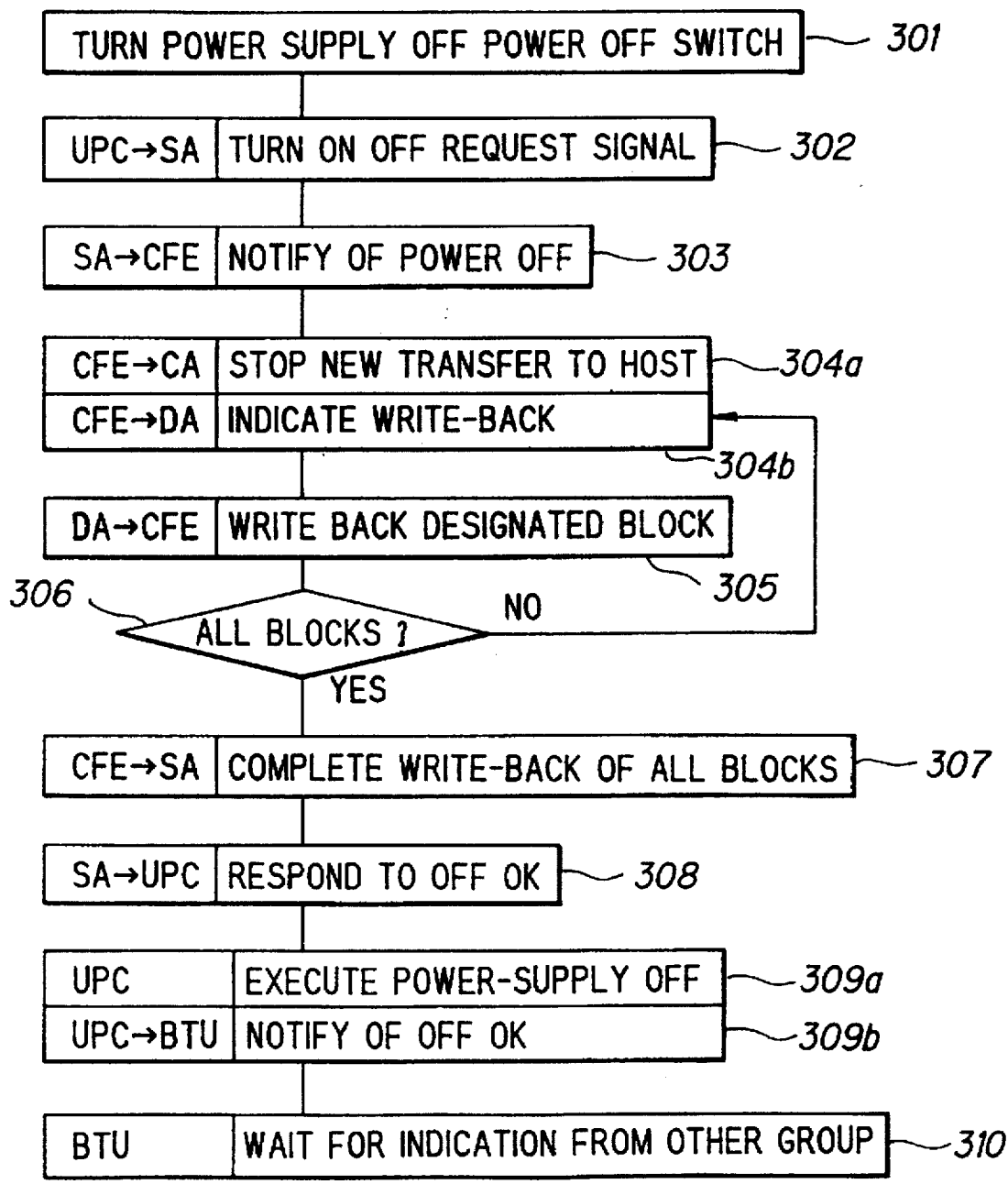
FIG. 24 is a flowchart showing battery back-up control.

FIG. 24 is a flowchart showing battery back-up control of the cache memory as performed in one group (Group 0, for example).

When the power-supply switch is turned on (step 301), the unit power controller 39a turns on the off-request signal OFF REQ and sends it to the service adapter 36a (step 302). Upon receiving this signal, the service adapter 36a notifies the cache function engine 34a (step 303).

As a result, the cache function engine 34a instructs the channel adapter 31a to stop new transfers with the host (step 304a) and instructs the device adapter 32a to write back the data in the cache memory 33 in record units (in the case of a CKD disk) or block units (in the case of an FBA disk) (step 304b).

In response to being instructed to stop transfer, the channel adapter 31a is disconnected from the host and accepts no new requests. Further, the device adapter 32a writes back (saves) the designated record or block data from the cache memory to the direct-access storage device. It should be noted that a record to be transferred is a record whose flag FLAG is "1" or a block containing this record (step 305).

If write-back of the designated record or block is finished, the device adapter 32a notifies the cache function engine 34a. In response, the cache function engine 34a determines whether write-back of all blocks has been completed (step 306). If the answer is "NO", then the program returns to step 304b, where the device adapter 32a is instructed to write back the next record or block and processing from this step onward is repeated.

If write-back of all blocks has been completed, the cache function engine 34a notifies the service adapter 36a (of write-back completion) (step 307). If the service adapter 36a receives the indication of writeback completion from the cache function engine 34a, it sends the off-permission signal OFF OK (back-up unnecessary) to the unit power controller 39a (step 308).

Upon receiving the off-permission signal OFF OK, the unit power controller 39a performs power-supply cut-off (step 309a) and notifies the battery unit 39c, from the service adapter 36a by way of the off-permission signal OFF OK STATE (ON), of the fact that there was an OFF OK indication (back-up unnecessary indication) (step 309b). Further, the power-supply status signal POWER STATE turns off and the battery unit 39c recognizes that the power supply of Group 0 has turned off. The battery unit 39c stores the ON/OFF state of the power-supply status signal POWER STATE and the ON/OFF state of the off-permission signal OFF OK STATE, waits for an indication from the other group (Group 1) and decides the necessity of battery back-up of the cache memory 33 (step 310). It should be noted that the battery unit 39c does not perform battery back-up in a case where the power supply of one group is ON.

There are cases where an abnormality occurs when the power supply is off, as a result of which data is left in the cache memory because write-back of the data could not be completed. In such cases, the service adapter 36a does not transmit the off-permission signal OFF OK in response to the off-request signal OFF REQ from the unit power controller 39a. If the unit power controller 39a does not receive the off-permission signal OFF OK upon elapse of a period of time set by an internal timer, the power supply is turned off automatically and the service adapter notifies the battery unit 39c of the fact that the power supply has been turned off without any OFF OK indication (back-up unnecessary indication) (step 309b). In other words, the battery unit 39c is notified of the off-permission signal OFF OK STATE (OFF) and an of the power-supply status signal POWER STATE (OFF).

Furthermore, there are occasions where a power failure occurs as the reason for turn-off of the power supply at the time of an abnormality. In the event of a power failure, the unit power controller 39a does not issue the off-request signal OFF REQ to the service adapter 36a and the power supply is cut off. The battery unit 39c stores this condition, namely the fact that there was no off-permission signal OFF OK from the service adapter, and, as a result, enters a state similar to that at the time of an abnormality at turn-off of the power supply.

Figure 25:
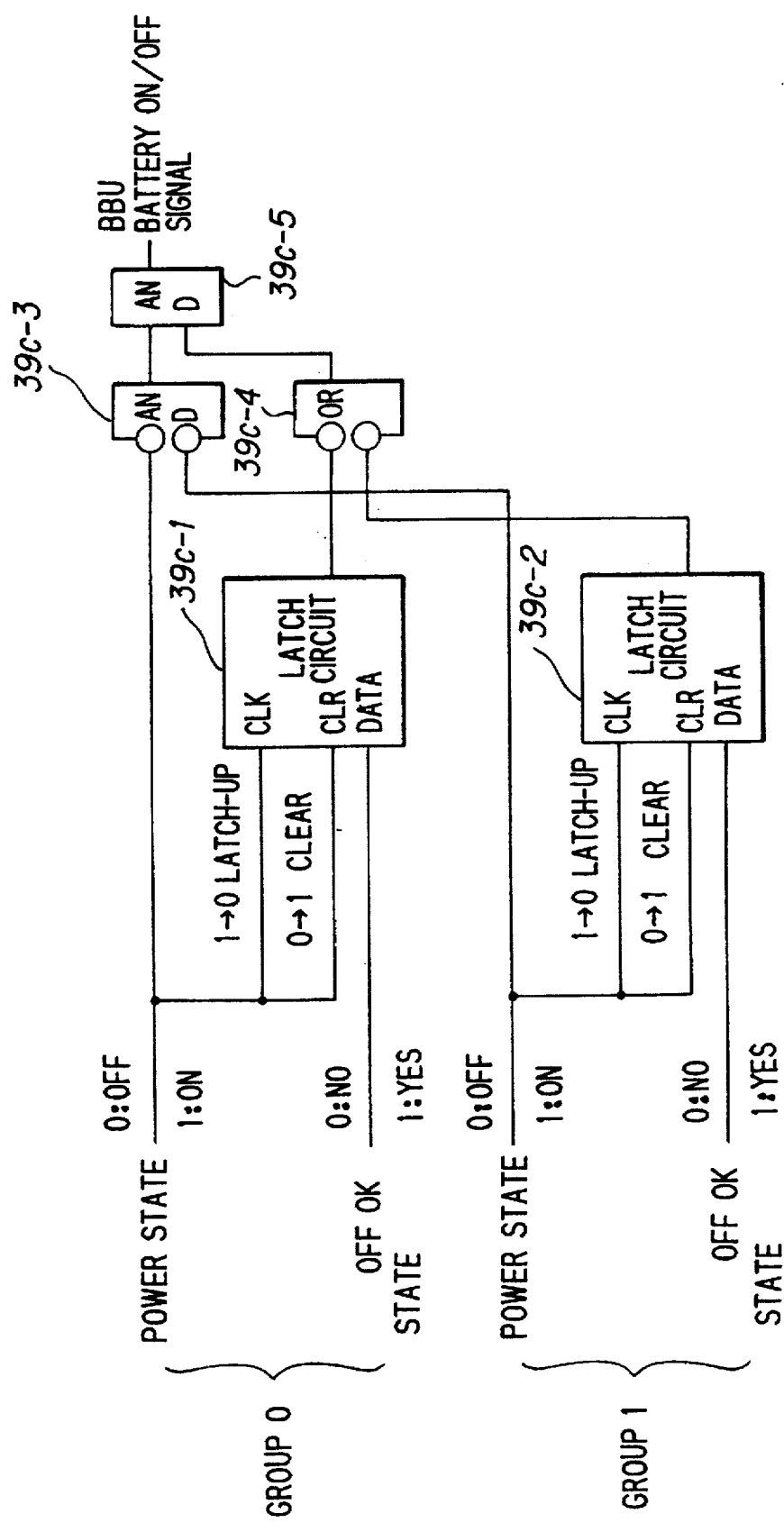
FIG. 25 is a circuit block diagram of a battery unit.

FIG. 25 is a circuit block diagram of the battery unit 39c. At states ②, ⑤ and ⑥ in FIG. 23, a back-up ON/OFF signal BBU is turned on. Latch circuits 39c-1, 39c-2 are provided in Groups 0 and 1, respectively. These latch the off-permission signal OFF OK STATE when the power-supply status signal POWER STATE changes from on to off; they are cleared when the power-supply status signal POWER STATE changes from off to on. Further provided are a NAND gate 39c-3, a NOR gate 39c-4 and an AND gate 39c-5. The back-up ON/OFF signal BBU is outputted based upon the power ON/OFF state and latch state. If the state of the power supply of one group is ON, the output of the NAND gate 39c-3 becomes "0" and the battery is turned off unconditionally (BBU="0"). The battery is turned on (BBU="1") if the power-supply states of both groups are off and the off-permission signal OFF OK of at least one group is "0" (back-up necessary).

In the foregoing arrangement, the battery unit 39c is provided so as to be shared by both groups. However, greater reliability can be obtained by providing redundant battery units, one in Group 0 and the other in Group 1. In the redundant arrangement of the battery units, cases occur in which a new or repaired battery unit is installed in the apparatus owing to failure or the like. When a battery unit is thus installed in the apparatus (when an INSTALL signal is turned on), it is necessary that the OFF OK STATE of Groups 0 and 1 stored in the battery unit currently in operation be copied to the newly installed battery unit.

Figure 26:
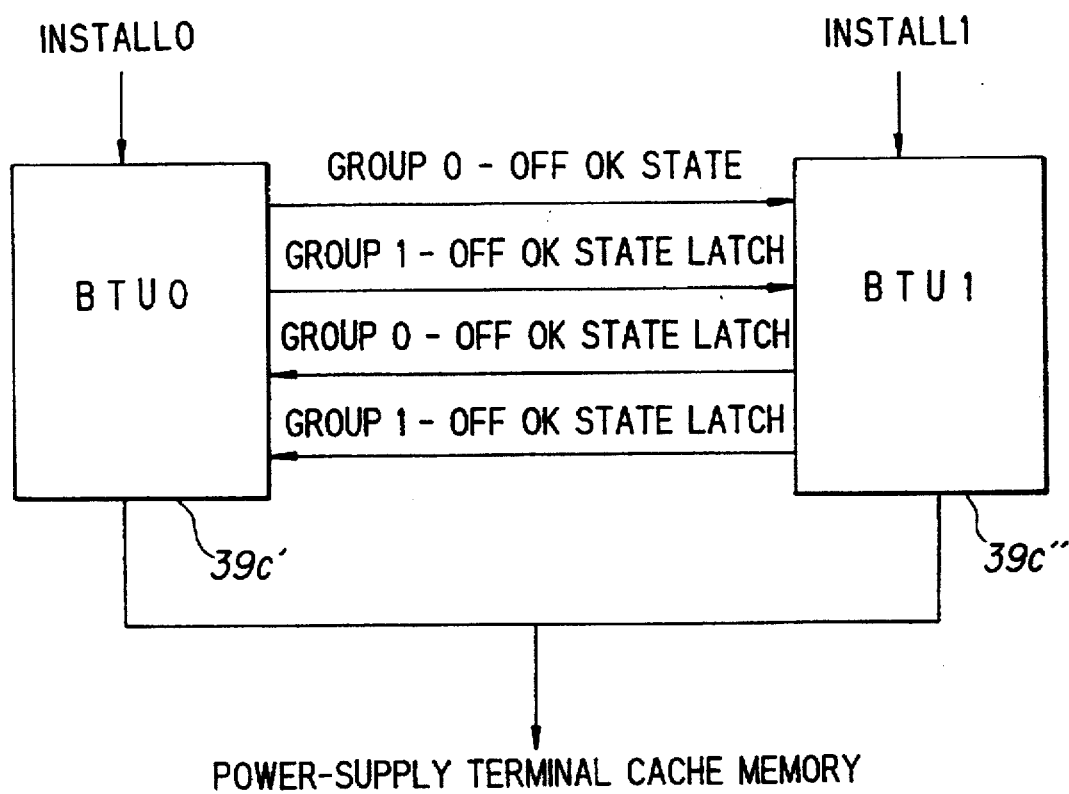
FIG. 26 is a block diagram for a case in which the battery unit is provided with redundancy.

FIG. 26 is a block diagram of the redundant structure of the battery units. Numerals 39c', 39c" denote battery units of Groups 0 and 1, respectively, each of which is capable of copying the off-permission signal OFF OK of Groups 0, 1 stored in the other. Battery supply terminals of the battery units 39c', 39c" are connected to power-supply terminals of the cache memory so that if one battery unit goes down, the other will supply power.

Figure 27:
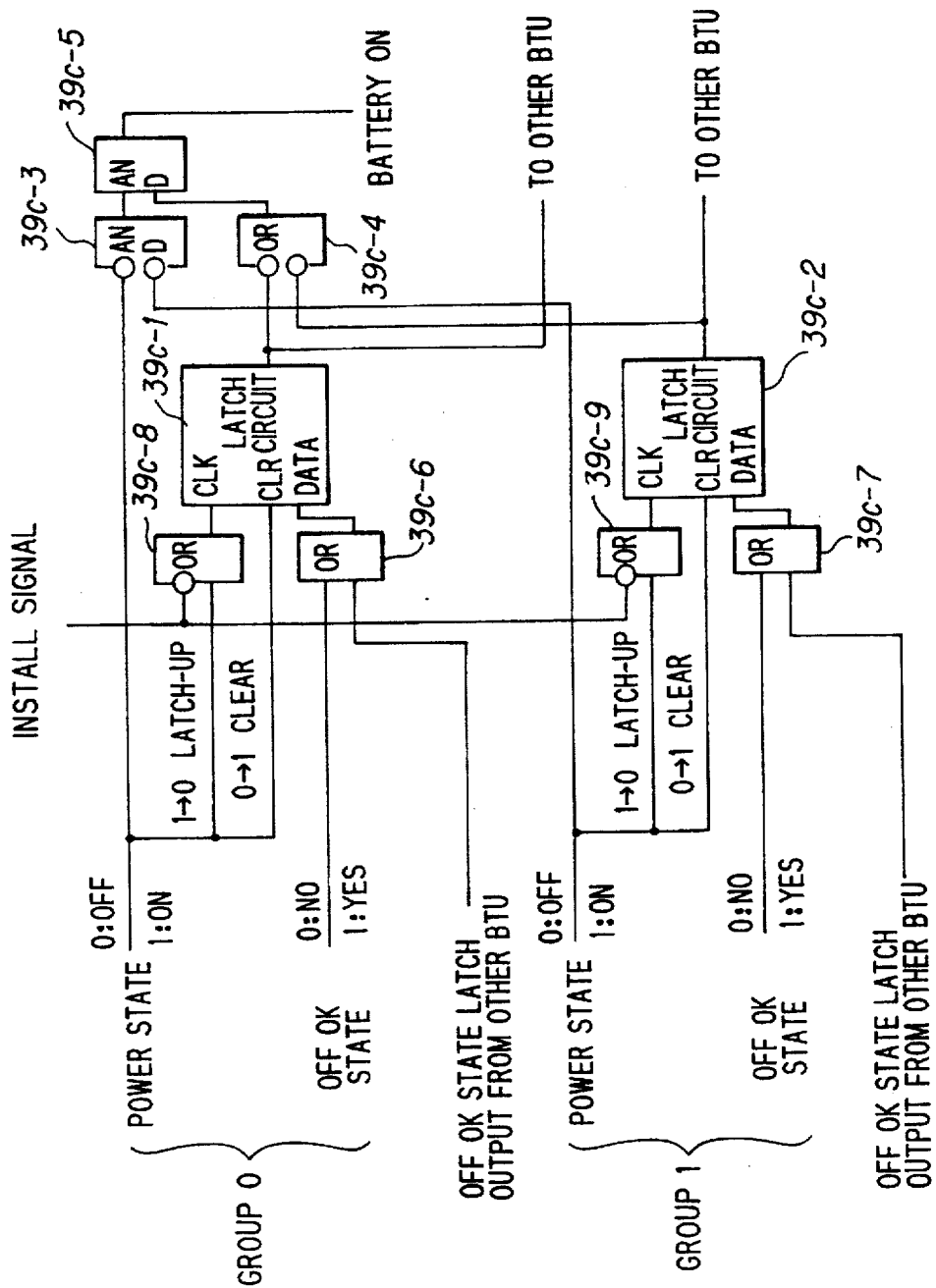
FIG. 27 is a circuit diagram showing the battery unit in the case where it is provided with redundancy.

FIG. 27 is a circuit block diagram showing the battery units 39c ', 39c " in the redundant arrangement. The fundamental arrangement is that of FIG. 25, in which the off-permission signal OFF OK STATE of the Groups 0, 1 retained in one battery unit can be copied to the other battery unit in response to the ON state of the INSTALL signal. Provided are OR gates 39c-6, 39c-7 and 39c-8, 39c-9, the latter two of which each have an inhibit terminal as one of their input terminals.

The foregoing describes control for battery back-up of the cache memory in a disk control unit having redundant Groups 0 and 1. However, the invention is applicable also to a non-redundant disk control unit. In such case, the battery unit judges whether the data stored in the cache memory has been saved on the disk at cut-off of power. The unit backs up the cache memory by battery if the data has not been saved and does not back up the cache memory by battery if the data has been saved.

Thus, since the cache memory is backed up by battery only when data needing to be backed up is present in the cache memory, there is little consumption of the battery. This means that the high-speed write mode using the cache memory can be utilized also when power is introduced next, thus making it possible to improve the functionality of the system and the operating efficiency. Further, by providing redundant batteries, a highly reliable system can be constructed.

(e) Fourth embodiment of the invention

In order to improve the functionality of the disk control unit and provide higher RAS performance, the control unit may be provided with redundancy. In accordance with such a redundant arrangement, if the channel adapter or device adapter of one group goes down, operation can continue by substituting the other group. However, in the resource manager RM that performs job control, carries out management control of the resources within the disk control unit and controls the information of the devices under the supervision of the control unit, redundancy is not achieved in the original sense of the word. That is, the various tables and control information being held in the control table stores of the resource managers of both groups differ from each other; if one resource manager goes down, the resource manager of the other group cannot be substituted for it.

The fourth embodiment of the invention is so adapted that when the resource manager RM of one of the Groups 0 and 1 goes down, the resource manager RM of the other group is capable of substituted. To this end, it is necessary to make identical the various control information (job content/order/ control information from the host side, resource information within the control unit, the status of each device, etc.) which the resource managers RM of both groups retain in their control table stores. If both groups are operating normally, the items of information can be made identical by performing updating for this purpose at all times. However, a problem encountered is the updating method and initializing method for a group's own control information when the unit of this group is started up; when the power supply of one group goes down; when one group is started up; during initialization of the control information; and when communication with the other party is interrupted.

This embodiment of the present invention solves this problem so that control information common to both groups can be logically retained at all times in any state.

Figure 1:
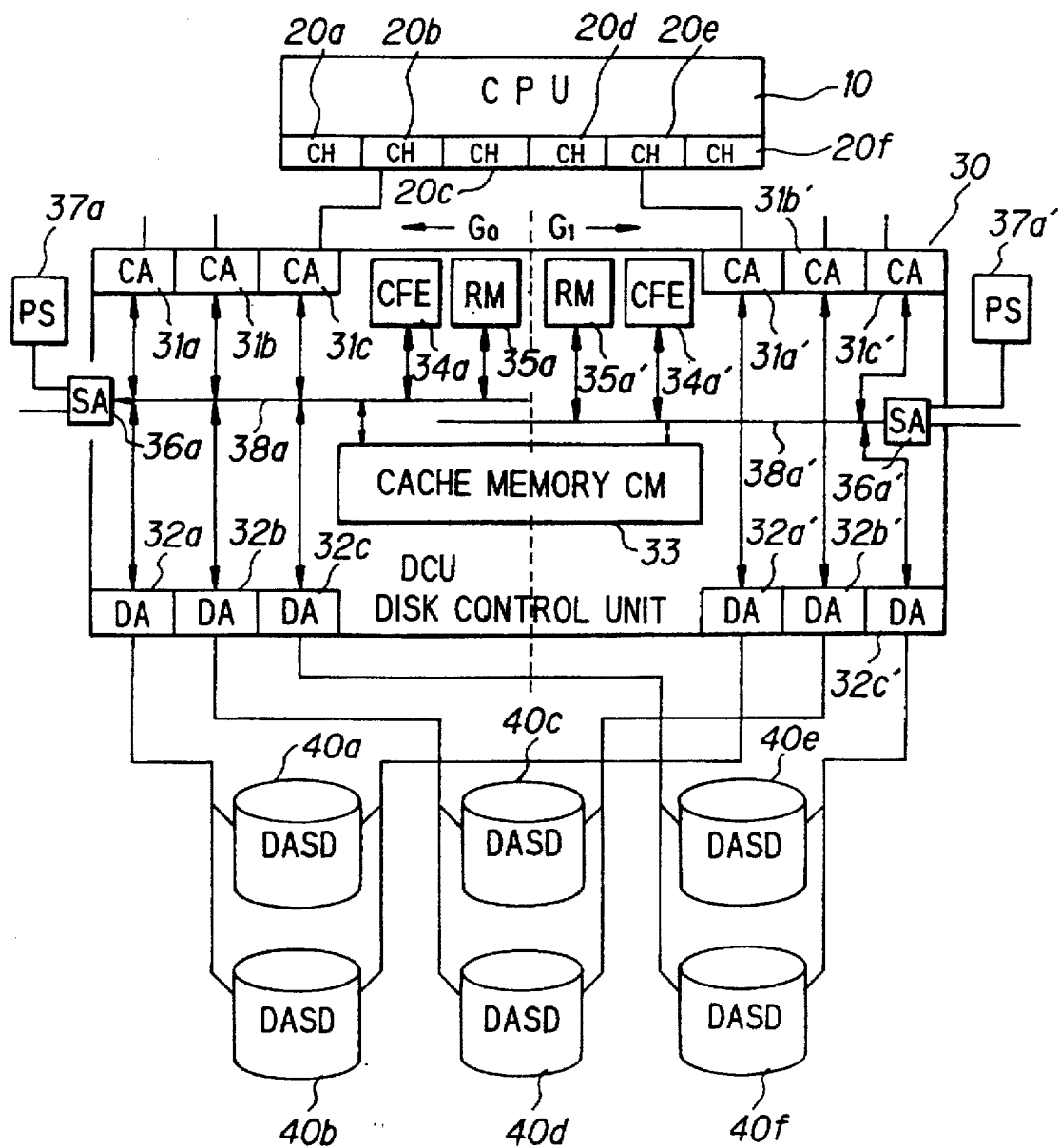
FIG. 1 is diagram showing the configuration of a system which includes a disk control unit having a cache memory according to the prior art.
Figure 2:
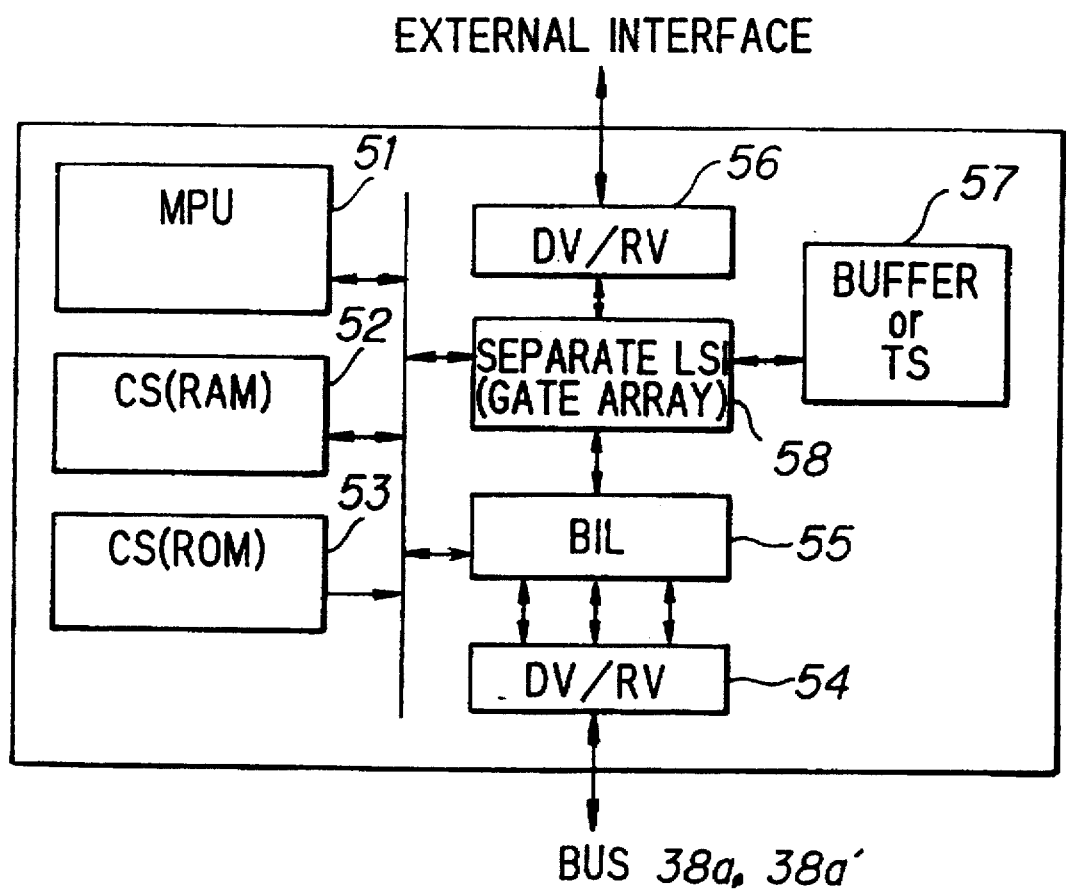
FIG. 2 is a diagram showing the description of a CA, a DA and an RM according to the prior art.
Figure 3:
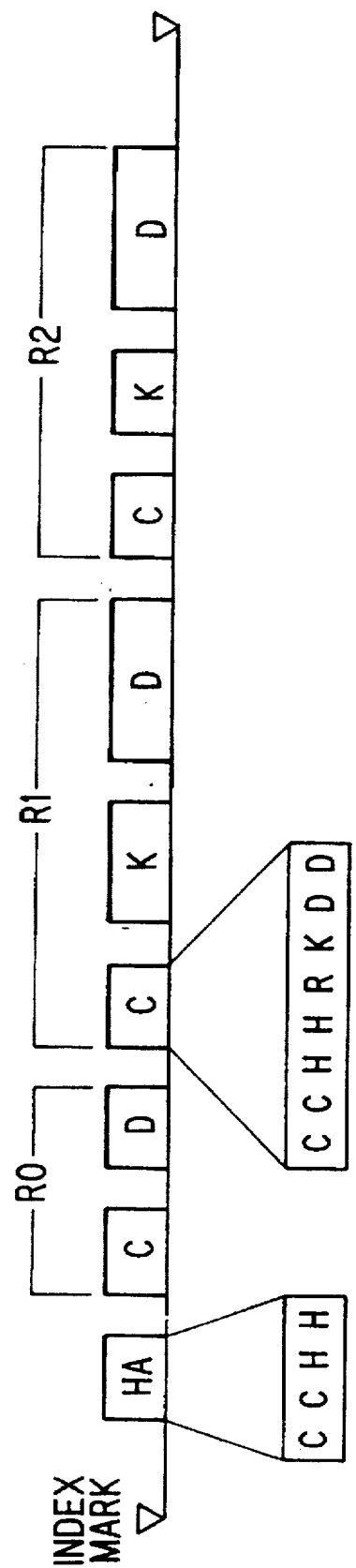
FIG. 3 is a diagram for describing a CKD format according to the prior art.
Figure 28:
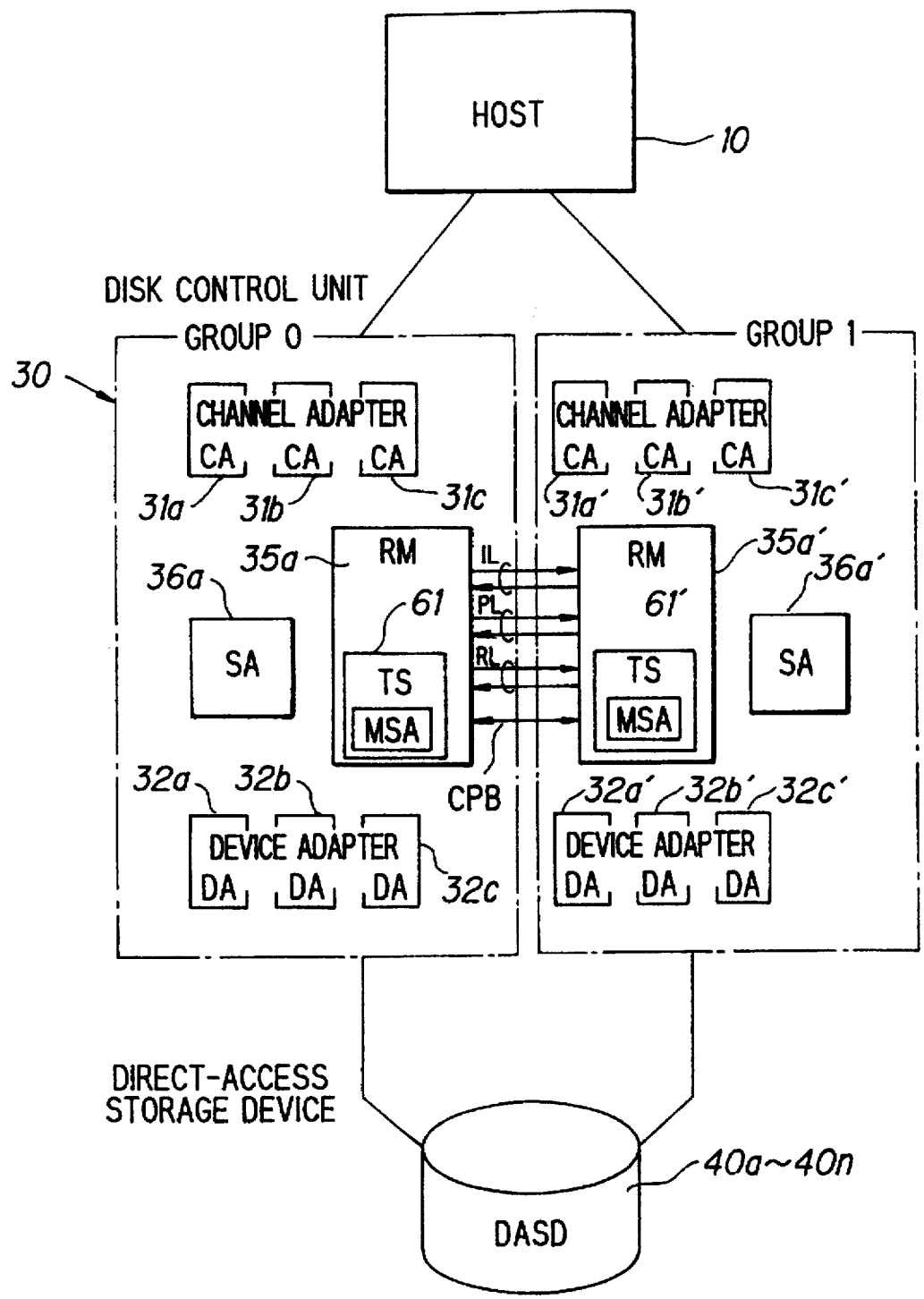
FIG. 28 is a block diagram showing a fourth embodiment of the invention.

FIG. 28 is a block diagram showing a fourth embodiment of the invention. The arrangement includes the host 10, the disk control unit 30 and the direct-access storage devices 40a-40n (only one of which is shown for the sake of convenience). The disk control unit 30 has a redundant structure the details of the construction of which are illustrated in FIG. 1. For the sake of convenience, however, only the channel adapters (CA) 31a-31c, 31a'-31c', device adapters (DA) 32a-32c, 32a'-32c', resource managers (RM) 35a, 35a' and service adapters 36a, 36a are illustrated. The resource managers 35a, 35a' are provided with respective control table stores (TS) 61, 61' for storing various control information and tables. An address area specific to each control table is allocated as a message area MSA. One resource manager reads information that has been written in the message area of the other resource manager, whereby communication between the managers (communication between the controls) is possible.

The resource managers 35a, 35a' the two groups are connected by a plurality of signal lines and a copy bus. Interrupt lines are connected from one group to another and are for communicating the fact that a certain message has been written in the message area MSA of the control table stores 61, 61' from one group to the other. As the result of a change (ON/OFF) in this interrupt line, the resource manager RM of the other group reads the content of the message stored in the message area MSA of the other party. A conduction-state notification line PL is for notifying the other group of the conduction state (power supply ON/OFF) of its own group. An operating-state notification line RL is for notifying the other group whether its own group is in an operable state (READY) or non-operable state (NOT READY). A control-table copy bus CPB is provided. Information is read from the control table of the other group via this copy bus and is copied to the control table of its own group. The copy bus includes an address line and a data line.

Figure 29:
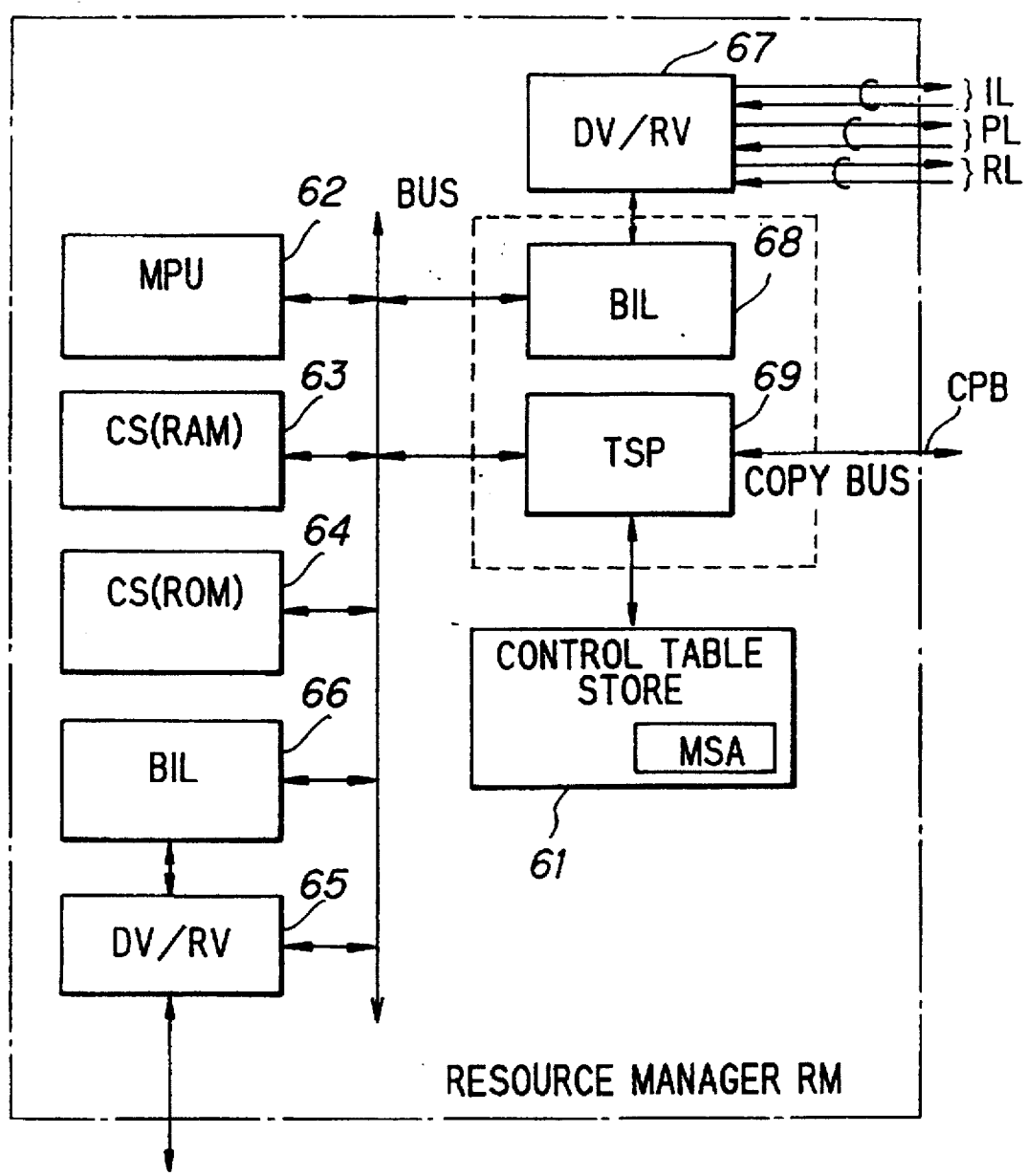
FIG. 29 is a block diagram showing a resource manager RM.

FIG. 29 is a block diagram illustrating the resource manager 35a, the construction of which is identical with that of the resource manager 35a'. The resource manager 35a includes a control table source 61, a microprocessor (MPU) 62, a control store (CS) 63 comprising a RAM, a control store (CS) 64 comprising a ROM, a driver/receiver (DV/RV) 65 connected to the internal bus of the disk control unit, bus interface logic (BIL) 66, a driver/receiver (DV/RV) 68 connected to an external interface, bus interface logic 68 provided between the driver/receiver 67 and a bus BUS for performing bus interface control, and a table storage port (TSP) for controlling the control table and the copy bus CPB.

The microprocessor 62 writes data, which is to be sent to the other group, in the message area MSA via the table storage port 69 and subsequently raises the interrupt line IL to the high level. As a result, the resource manager of the other group accesses the message area MSA via the copy bus CPB and reads the data that has been written in this message area. Such communication between the resource managers is referred to as inter-control communication or inter-manager communication. Copying of the control table can be performed by this inter-control communication. Specifically, in a case where the resource manager of one group has updated the contents of the control table, the updated contents are set in the message area MSA, after which the fact that updating has been carried out is communicated to the resource manager of the other group via the interrupt line (message signal line) IL. As a result, the resource manager of the other group reads the updated data from the message area MSA of the other party via the copy bus CPB and updates the contents of its own control table store by this data.

As shown in FIG. 30, the control table stores 61, 61' of the resource managers 35a, 35a' store various control tables, such as an exclusive management table EAT, a path group table PGT and a physical construction table PCT, by way of example, as well as various control information.

The exclusive management table EAT stores whether direct-access storage devices (devices 1, 2, 3, ...) are in use or not in use in correlation with each of the channel adapters. When a request for use of a prescribed device is issued from a channel adapter, the resource manager allows this use in a case where none of the other channel adapters is using the direct-access storage device. If the device is in the process of being used, the resource manager executes exclusive control, in which the requested use is not allowed.

The path group table PGT stores which path (channel adapter) is connected to which host apparatus. A path group is constructed for every host. When head positioning is completed (e.g., when the search ID operation is concluded), or when the end of various operations is reported to the host apparatus, the resource manager determines which channel adapter is connected to the host apparatus (searches for a channel adapter of the same group) and causes an idle channel adapter or a channel adapter having the lowest busy percentage to make a report to the host apparatus by an interrupt. As a result, a plurality of channel adapters can be utilized effectively (this is a dynamic path recombining function).

The physical construction table PCT indicates the physical construction of an I/O subsystem. The table PCT stores the channel adapters constructing the system, the device adapters capable of being accessed from each channel adapter, and the direct-access storage devices capable of being accessed from each channel adapter.

The exclusive control table ECT, the path group table PGT and other control information change successively during operation.

FIG. 31 is a chart showing a control-table processing method implemented by a resource manager. This chart illustrates what the resource manager must do with regard to the control table in dependence upon the operating state of its own group and that of the other group as well as the status of the signal line from the other party. In a case where the resource manager is in the on-line state unassisted, initial microprogram loading (IML) is performed in response to turn-on of power, the READY state is attained in response to completion of IML, initialization of the control table is performed thereafter, and the online state is attained in response to completion of initialization.

In FIG. 31, there are five operating states of the other party, namely ① the power-on state; ② IML in progress; ③ waiting for other party (e.g., waiting for end of initialization of the other party's table); ④ table initialization in progress; and ⑤ online operation in progress. Power ON/OFF, READY/NOT READY communicated to the device's own group by the conduction-state notification signal line PL and operating-state notification signal line RL at the time of each state are as shown. There are four operating states of the device's own group (RM0), namely ① IML completion; ② waiting for initialization of other party; ③ table initialization in progress; and ④ online operation in progress.

FIG. 31 illustrates what the resource manager of its own group must do on the basis of the combination of the operating states of the other group (RM1) and its own group (RM0). The fundamentals of this approach are as follows:

(1) If its own group is not online and the status is ahead of that of the other group, initialization of its own control table is performed and the other party is placed in the waiting state (the other party copies its own control table after the completion of initialization).

(2) If its own group is not online and the status is the same as that of the other group, its own group and the other group both attain the waiting state. However, a resource manager (RM0) set beforehand performs initialization and the other resource manager (RM1) enters the waiting state.

(3) In a case where status lags behind that of the other group and the other group is not online, the waiting state is attained, completion of initialization of the other group is awaited and the control table of the other group is copied.

(4) In a case where its own group is not online and the other group is currently performing an online operation, the control table of the other group is copied.

(5) If its own group is currently performing an online operation, copy processing is executed in response to a copy request from the other party.

Figure 32:
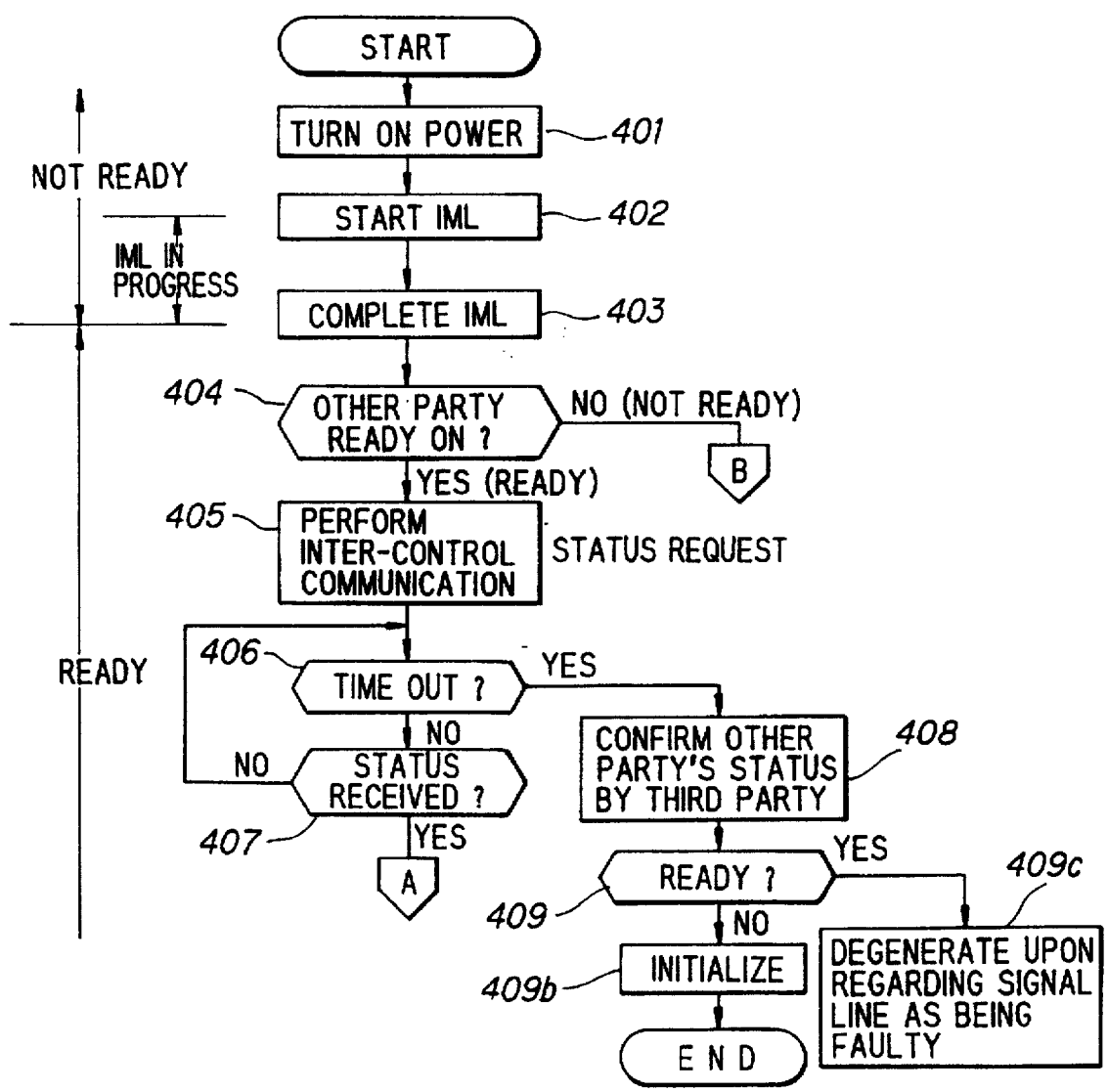
FIG. 32 is a flowchart (part 1) of control-table initialization processing and copy processing.
Figure 33:
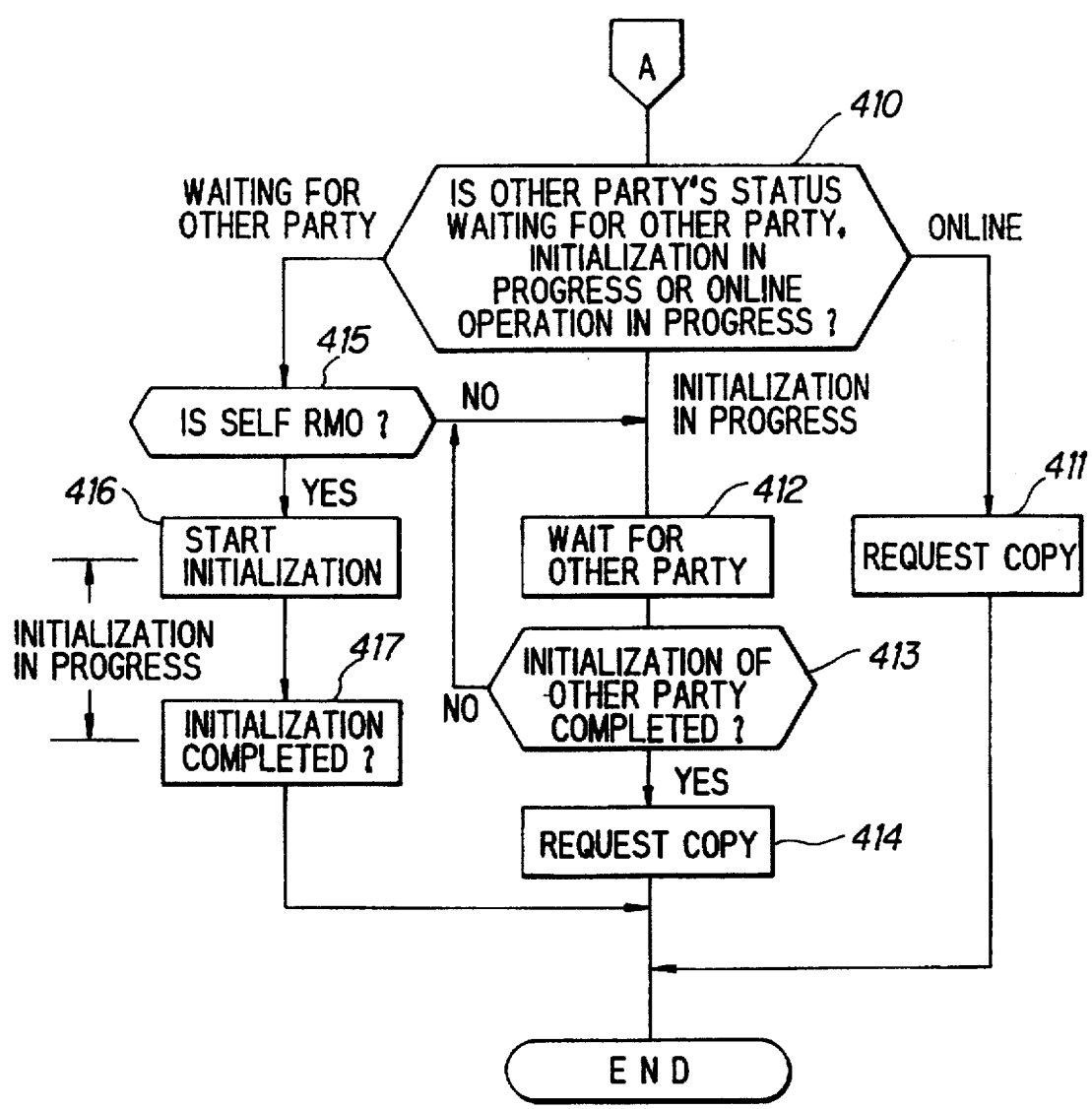
FIG. 33 is a flowchart (part 2) of control-table initialization processing and copy processing.
Figure 34:
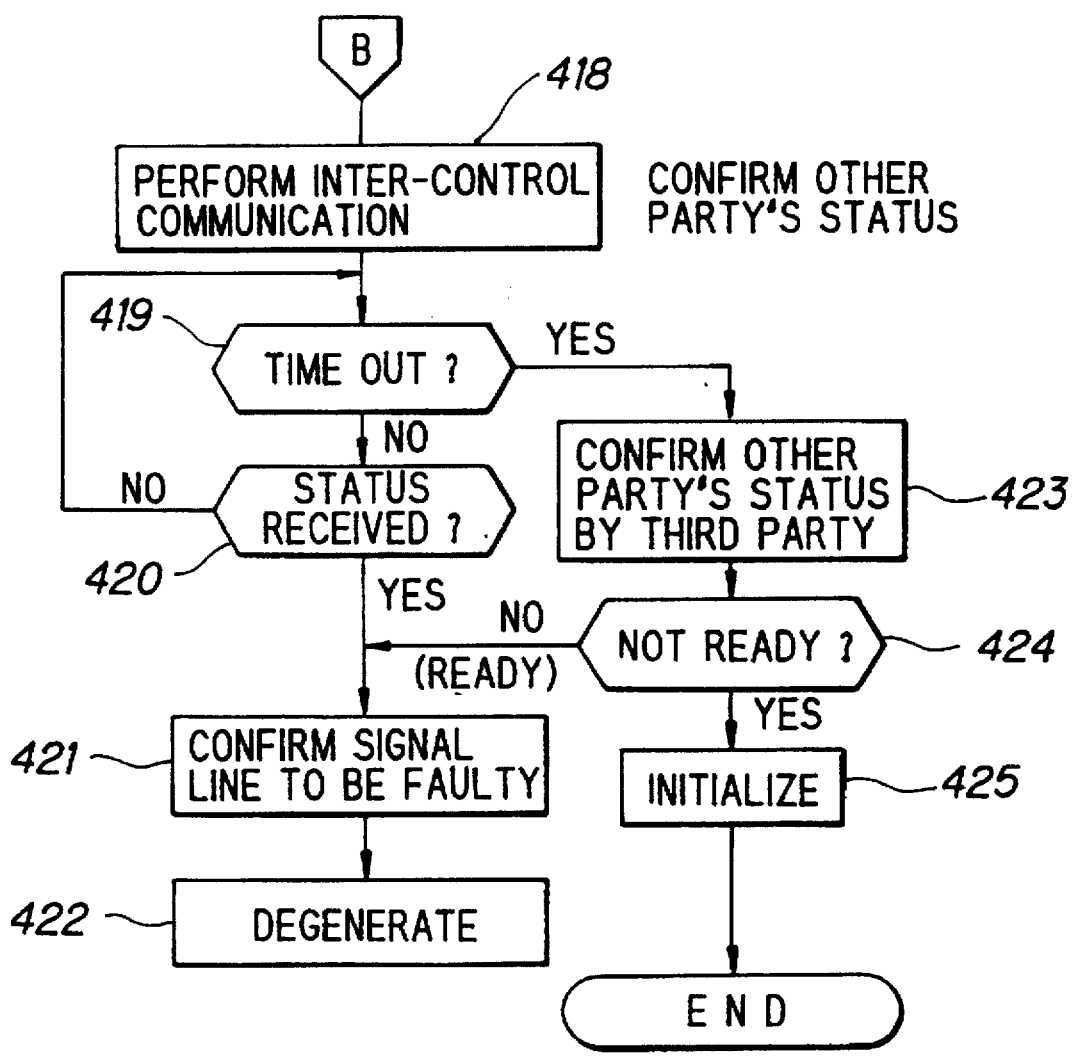
FIG. 34 is a flowchart (part 3) of control-table initialization processing and copy processing.

FIGS. 32–34 are flowcharts illustrating processing for initializing and copying a control table.

When the power supply of a group which is its own group is turned on (step 401), IML is started (step 402) and the READY state is attained in response to completion of IML (step 403). Next, it is determined whether the operating state of the other party is READY by referring to the operating-state notification signal line RL (step 404). If the state is the READY state, the state of the other party is requested by inter-control communication (step 405). If notification of the state is received from the other party before elapsed of a prescribed period of time (steps 406, 407), processing conforming to the state of the other party is executed.

If notification of state is not received from the other party even upon elapse of a prescribed period of time, an inquiry is made of a service adapter, which is a third party, with regard to the state of the other party (step 408). If the resource manager of the other party is in the NOT READY state, the service adapter so notifies the resource manager by the status information of the overall unit, whereby the resource manager initializes the table of its own group (steps 409a, 409b). However, if the READY state prevails at step 409a, the signal line is considered to be faulty and an alarm is sent to the operation panel or the like to effect standby (degeneration; step 409c).

If the other party's status is received before elapse of the set time at step 407, then it is determined whether the other party's status is "waiting for other party", "initialization in progress" or "online operation in progress" (step 410). If the other party is performing an online operation, a copy request is sent to the party immediately by inter-control communication, the contents of the other party's control table store is copied exactly and processing is terminated (step 411).

If the other party's status is "initialization in progress", then a state is attained in which the other party is awaited (step 412), completion of initialization of the other party's table is awaited (step 413) and the contents of the other party's control table store is copied in response to completion of initialization (step 414).

If the other party's status is "waiting for other party", the resource manager determines whether it itself is RM0 (step 415). If the answer is "NO", then the resource manager waits for the other party and executes processing from step 412 onward. In a case where the resource manager has itself been set at RM0 beforehand, initialization of the table is started and the online state is attained in response to completion of initialization (steps 416, 417).

If the other party is found to be in the NOT READY state by the operating-state notification signal line RL, then the signal line is considered to be faulty and the processing described below is executed.

Specifically, the other party's status is verified by inter-control communication (step 418). If the status is received from the other party before elapse of a set period of time (steps 419, 420), then the other party has advanced to a state ahead of the READY state and the operating-state notification signal line RL will not attain the NOT READY state. Therefore, the operating-state notification signal line RL is considered to be faulty (step 421) and an alarm is sent to the operation panel or the like to effect standby (degeneration; step 422).

If the status is not received from the other party even upon elapse of a prescribed period of time, an inquiry is made of a service adapter, which is a third party, with regard to the state of the other party. After the service adapter ascertains the states of the overall unit, it informs the resource manager of the status of the other group (step 423).

The resource manager verifies the READY/NOT READY state of the other party (step 424). In case of the READY state, the signal line (conduction/ready signal) is considered to be faulty and processing from step 421 onward is executed. However, in case of the NOT READY state, the signal line (conduction/ready signal) is normal and control table is initiated on the assumption that the other group must certainly be in the NOT READY state (step 425).

Figure 35:
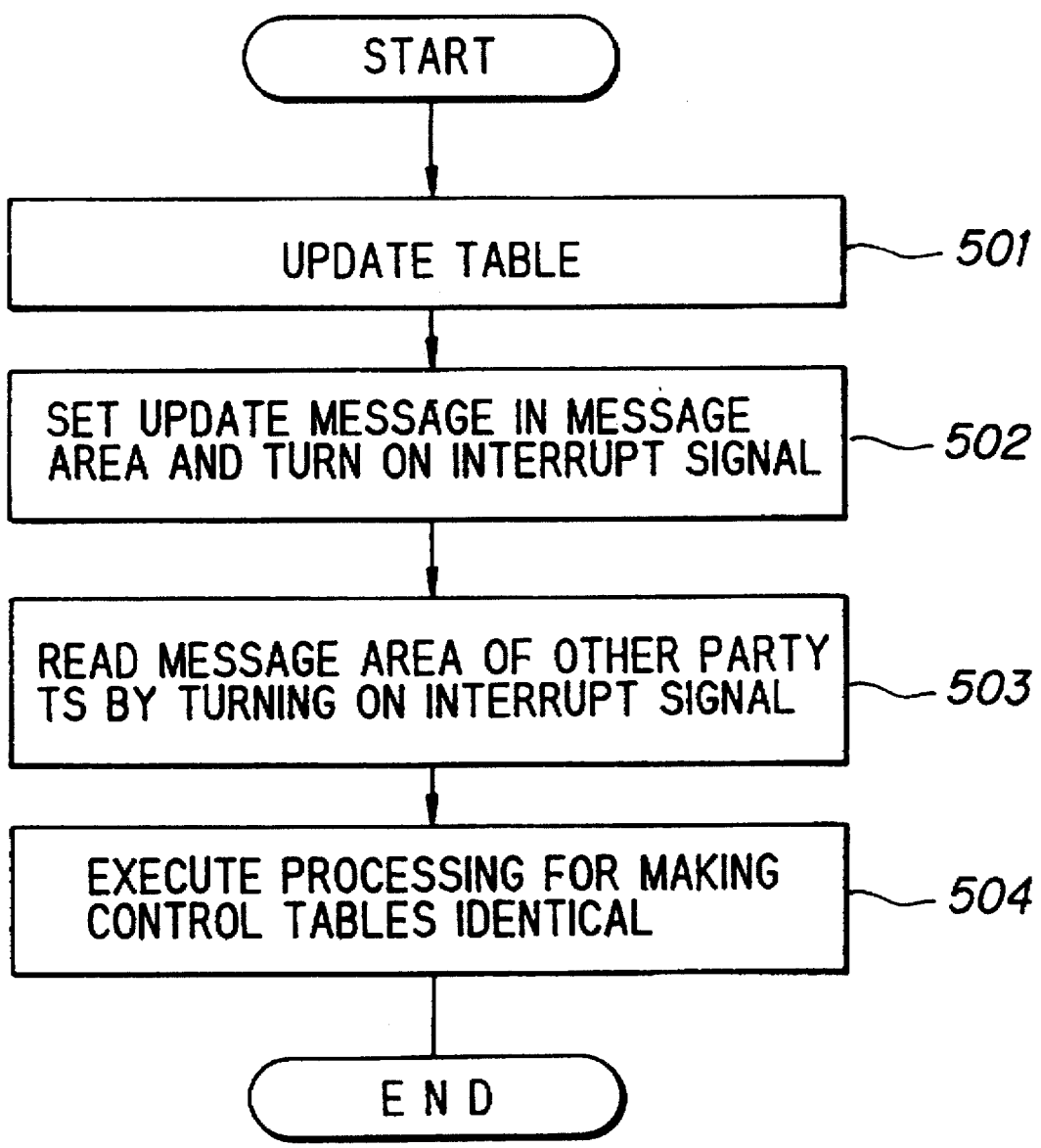
FIG. 35 is a flowchart of processing for making control tables identical.

FIG. 35 is a flowchart of copy processing executed after one group has updated the control table.

If the contents of the control table store 61 are updated (step 501), then the microprocessor 62 sets an update message to the message area MSA and raises the interrupt line IL to the high level (step 502).

When the interrupt line IL attains the high level, the resource manager of the other group reads the update message, which has been set in the message area MSA of the other party, via the copy bus CPB (step 503), recognizes the fact that the control table of the other party has been updated and, on the basis of read information updates the contents possessed by its own control table (step 504).

Figure 36:
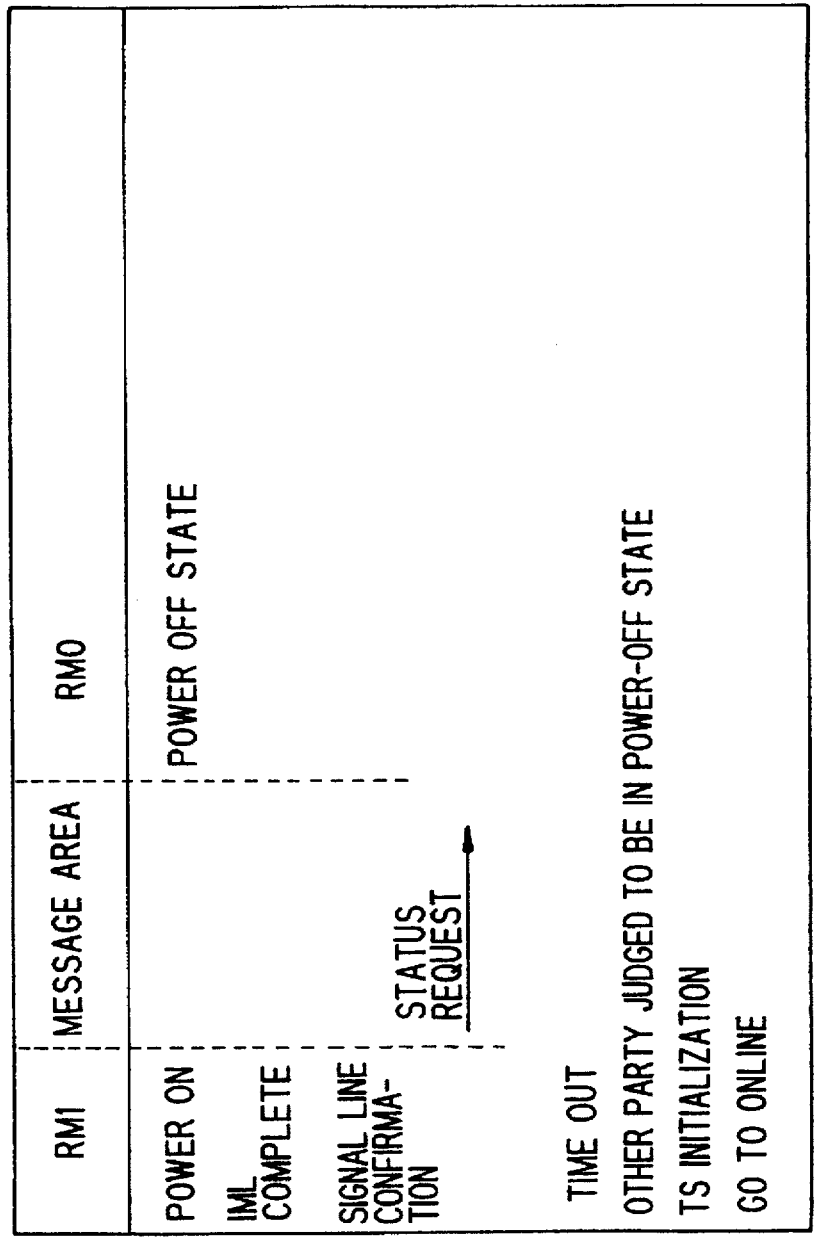
FIG. 36 is a diagram for describing a start-up procedure in a case where a power supply has been turned off in another group.

FIG. 36 is a diagram for describing a start-up procedure when the power supply has been turned on in the resource manager's (RM1) own group in a case where the power supply is off in the other group (RM0).

If the power supply in the resource manager's own group is turned on, then IML is executed immediately. The other party's status is discriminated by the signal line upon completion of IML. In this case, the fact that the power supply of the other group is off can be discriminated by the conduction-state notification signal line PL.

Next, the status of the other group is verified by inter-control communication. If the power supply of the other group is certainly off, then its own status cannot be communicated even upon elapse of the set time period and, hence, TIME OUT is established. When this occurs, it is confirmed that the power supply of the other group is certainly off, the control table TS is initialized and the online state is attained. An arrangement can be adopted in which, when TIME OUT occurs, the service adapter also is made to verify the status of the other party. This is the case in the flowchart of FIG. 34.

Figure 37:
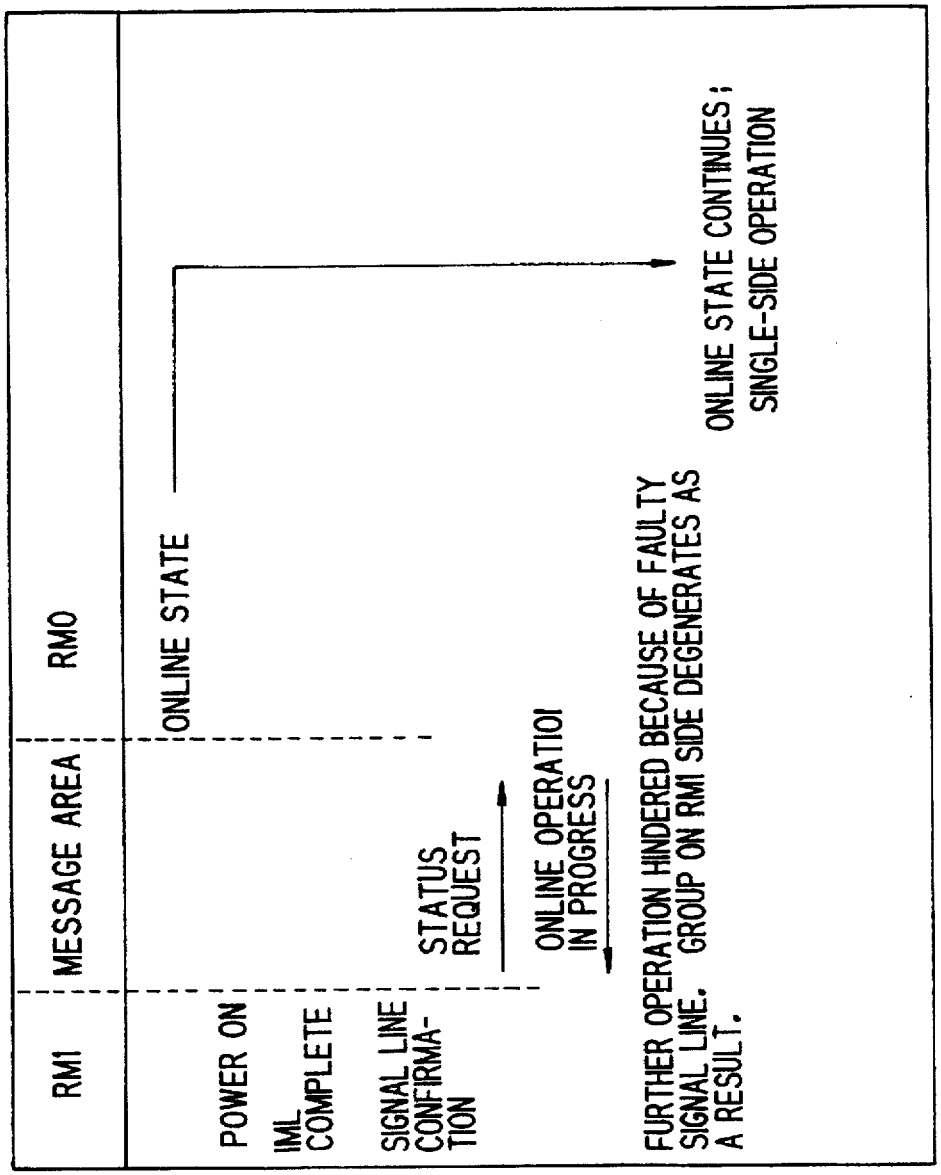
FIG. 37 is a diagram for describing a procedure in a case where a faulty signal line exists.

FIG. 37 is a diagram for describing the procedure in a case where it appears that the power supply is in the off state, owing to a fault in the signal line, despite the fact that the other group is currently online.

If the power supply in the resource manager's own group is turned on, then IML is executed immediately. The other party's status is discriminated by the signal line upon completion of IML. In this case, it appears that the power supply of the other group is off owing to a fault in the conduction-state notification signal line PL. Next, it is clarified that the other group is in the online state by inter-control communication. As a result, it is construed that the signal line is faulty, with further processing being hindered. Accordingly, an alarm is sent to the control panel and start-up of the resource manager's own group is halted. It should be noted that the overall system now operates based solely on one of the two groups.

Figure 38:
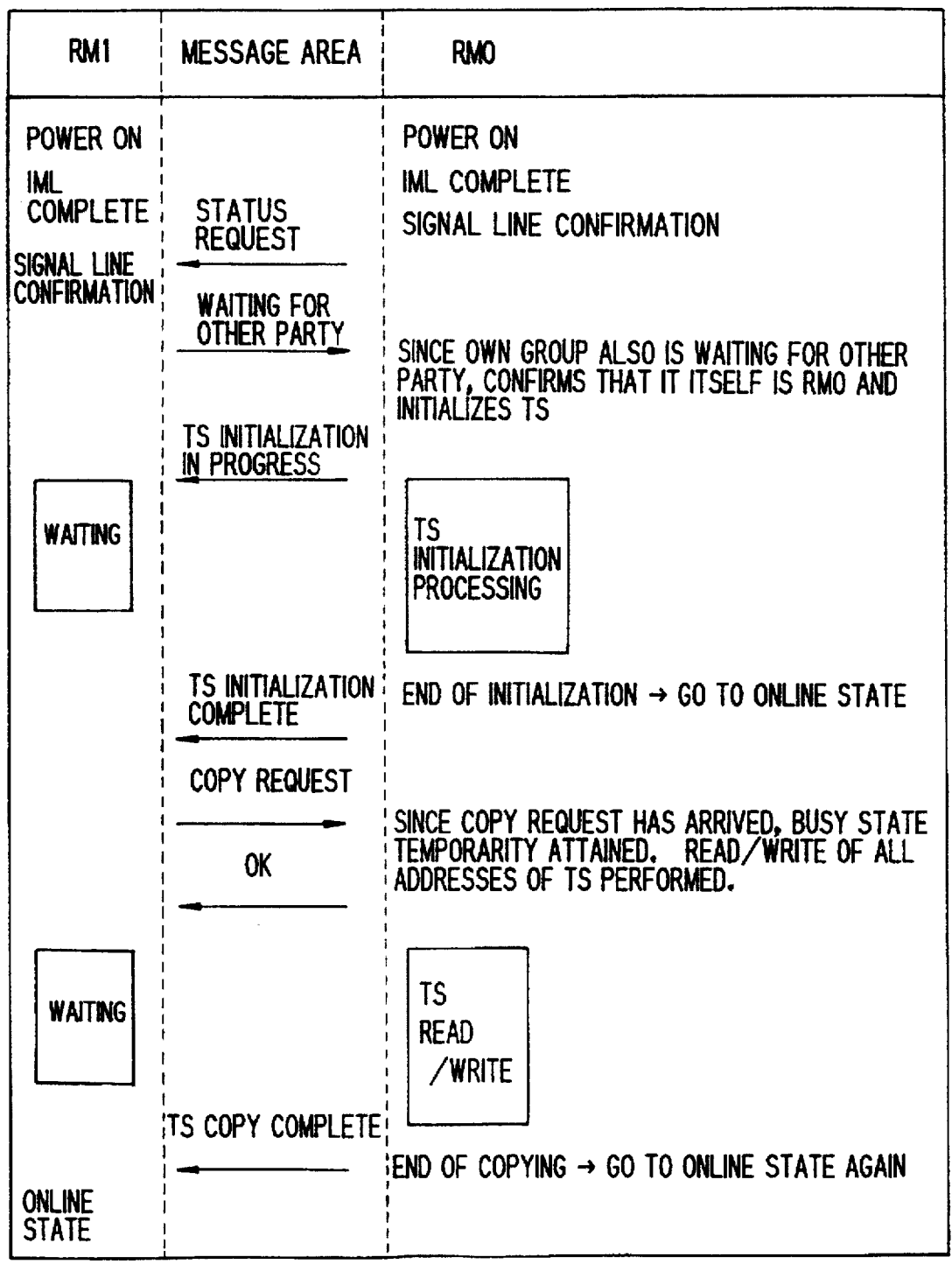
FIG. 38 is a diagram for describing a control procedure in a case where start-up occurs simultaneously.

FIG. 38 is a diagram for describing a control procedure in a case where start-up occurs simultaneously in both Group 0 (RM0) and Group 1 (RM1).

When the power supplies of both groups are turned on and IML is completed, both groups attain the state "waiting for other party". The resource manager (RM0) of Group 0 inquires about the state of Group 1 by intercontrol communication and confirms that Group 1 is "waiting for other party". When both groups thus attain the state "waiting for other party", Group 0 (RM0) is set in advance on the assumption that its own control table TS will be initialized. As a result, Group 0 notifies Group 1 that it itself is being initialized and performs initialization of the control table TS. If initialization is completed, then Group 1 is so informed by inter-control communication and the online state is attained.

In response to completion of initialization of the other party, Group 1 issues a request to copy the control table of Group 0. In response to the copy request, Group 0 temporarily attains the busy state, reads out the contents of all addresses of the control table store, writes this data in the control table store of the Group 1 via the copy bus and completes copying. Thereafter, both groups attain the online state.

If the foregoing arrangement is adopted, the content of control information possessed by the two independent groups can be assured regardless of the states which the groups attain. This makes it possible to achieve redundancy of a highly reliable magnetic disk control unit.

In the foregoing, the ID portion indicating the corresponding relationship between the number of a record contained in an FBA block and the record position is provided at a fixed position in the FBA block. When a head positioning command is issued from the host apparatus in the CKD format, a device adapter obtains the number of the FBA block corresponding to the parameter value of this positioning command, reads one CKD track of blocks from the FBA block designated by this FBA block number and develops the read blocks in a cache memory. The channel adapter refers to the corresponding relationship to retrieve the record, which has been designated by the host apparatus, in the cache memory. As a result, even if the disk device is an FBA disk device, positioning control and data retrieval control with regard to a seek command, set-sector command and search ID command can be performed just as in the case of a CKD disk device.

Further, the device adapter reads one CKD track of blocks from the FBA block designated by the FBA block number and develops these blocks in a buffer, during which time the device adapter develops the FBA blocks from the buffer in the cache memory block by block. Whenever the storage of one FBA block of data in the cache memory is completed, the device adapter issues notification of completion, whenever the notification of completion is issued, the channel adapter searches the cache memory for the record designated by the host apparatus. If the record exists, the channel adapter reads the record out of the cache memory and transfers it to the host apparatus. By virtue of this arrangement, the present invention makes it possible to read a desired CKD record from the cache memory while an FBA block is written in the cache memory, and data transfer control (concurrent transfer control) similar to that in the case of a CKD disk device can be carried out even in the case of an FBA disk device.

Furthermore, in accordance with the present invention, a battery unit backs up the cache memory only in a case where data to be backed up is present in the cache memory. As a result, battery consumption can be prevented, thus making it possible to utilize the high-speed write mode immediately after the introduction of power.

Further, in accordance with the present invention, shared control information possessed by the Group 0 and Group 1 resource managers can be made the same at all times regardless of the states of the groups. Even if the resource manager of one group goes down, control can be continued by the resource manager of the other group so that the overall system will not shut down.

As many apparently widely different embodiments of the present invention can be made without departing from the spirit and scope thereof, it is to be understood that the invention is not limited to the specific embodiments thereof except as defined in the appended claims.

What is claimed is:

1. A control method in a disk control unit provided between a host apparatus and a disk device and having a channel adapter for interfacing the host apparatus, a device adapter for interfacing the disk device, and a cache memory, wherein one CKD track is partitioned into a plurality of FBA blocks each of which is a fixed length and the disk device is accessed in FBA block units, said method comprising the steps of:

providing, at a prescribed position of an FBA block, an ID portion indicating a corresponding relationship between a number of each CKD record contained in the FBA block and a position of each CKD record;

computing a FBA block number corresponding to a parameter value contained in a head positioning command when the head positioning command has been issued from the host apparatus in a CKD format;

positioning a head at the beginning of a FBA block designated by said computed FBA block number;

reading and developing in said cache memory, by said device adapter, all blocks from said designated FBA block to a final FBA block within the CKD track to which said designated FBA block belongs; and retrieving a CKD record, which has been designated by the host apparatus, in said cache memory by said channel adapter by referring to said corresponding relationship between a number of said designated CKD record and a position of the designated CKD record.

2. The method according to claim 1, wherein if a record contained in an FBA block is a final record of the CKD track, data EOT indicative of this fact is registered in the ID portion of said FBA block in advance and FBA blocks are read from the FBA block designated by said FBA block number to a final FBA block within the CKD track by said device adapter.

3. The method according to claim 1, wherein said command is a seek command or a set-sector command, the parameter being a CKD track number (CCHH) designated by the seek command if the command is said seek command and a sector value designated by the set-sector command if the command is said set-sector command.

4. The method according to claim 1, further comprising the step of causing the channel adapter to read the retrieved data out of the cache memory and transfer the data to the host apparatus in a case where data is read.

5. The method according to claim 1, further comprising the steps of:

causing the channel adapter to rewrite data in the cache memory in a case where data is rewritten; and subsequently causing the device adapter to transfer the rewritten data to the disk device in FBA block units.

6. A control method in a disk control unit provided between a host apparatus and a disk device and having a channel adapter for interfacing the host apparatus, a device adapter for interfacing the disk device, and a cache memory, wherein one CKD track is partitioned into a plurality of FBA blocks each of which is a fixed length and the disk device is accessed in FBA block units said method comprising the steps of:

providing, at a prescribed position of an FBA block, an ID portion indicating a corresponding relationship between a number of each CKD record contained in the FBA block and a position of each CKD record;

computing an FBA block number corresponding to a parameter value contained in a head positioning command when the head positioning command has been issued from the host apparatus in a CKD format;

causing said device adapter to read and store, in an internal buffer, all blocks from an FBA block designated by the computed FBA block number to a final FBA block within the CKD track to which said computed FBA block belongs, and, while these blocks are being stored in said buffer, to develop these blocks in said cache memory one FBA block or plural FBA blocks at a time from said buffer;

causing said device adapter to issue a completion notification whenever storage of one FBA block or plural FBA blocks of data in said cache memory is completed; and causing said channel adapter to search said cache memory for a record, which has been designated by the host apparatus, by referring to said corresponding relationship whenever the completion notification is issued, and, in a case where the designated record exists, to read the record out of said cache memory and transfer it to the host apparatus.

7. The method according to claim 6, wherein said cache memory is constituted by a memory having a plurality of access ports, and writing of data in said cache memory and reading of data from said cache memory are performed simultaneously and concurrently.

8. A control method in a disk control unit provided between a host apparatus and a disk device and having a channel adapter for interfacing the host apparatus, a device adapter for interfacing the disk device, and a cache memory, wherein one CKD track is partitioned into a plurality of FBA blocks each of a fixed length and the disk device is accessed in FBA block units said method comprising the steps of:

providing, at a prescribed position of an FBA block, an ID portion indicating a corresponding relationship between a number of a record contained in the FBA block and a position of the record;

obtaining a FBA block number corresponding to a parameter value of a head positioning command when the head positioning command has been issued from the host apparatus in a CKD format;

causing said device adapter to read and store, in an internal buffer, all blocks from an FBA block designated by the FBA block number to a final FBA block within the CKD track to which said FBA block belongs, and, while these blocks are being stored in said buffer, to develop these blocks in said cache memory one FBA block or plural FBA blocks at a time from said buffer;

causing said device adapter to issue a completion notification whenever storage of one FBA block or plural FBA blocks of data in said cache memory is completed; and causing said channel adapter to search said cache memory for a record, which has been designated by the host apparatus, by referring to said corresponding relationship whenever the completion notification is issued, and, in a case where the designated record exists, to read the record out of said cache memory and transfer it to the host apparatus;

wherein said device adapter writes the completion notification in a control table provided in cache memory, and said channel adapter recognizes completion of writing of one FBA block by referring to said control table.

9. A control method in a disk control unit equipped with first and second groups each having a channel adapter for interfacing a host apparatus and a device adapter for interfacing a disk device, a cache memory provided so as to be shared by said first and second groups, and a battery unit for supplying the cache memory with battery voltage, wherein data commanded from the host apparatus is written in said disk device via said cache memory or data read from the disk device is transferred to the host apparatus via the cache memory, comprising the steps of:

storing, at cut-off of power in the first group, whether data that has been stored in said cache memory relating to said first group has been saved in said disk device;

determining, at cut-off of power in the second group, whether data that has been stored in said cache memory relating to said second group has been saved in said disk device;

if the data has been saved, deciding necessity of battery back-up of said cache memory based upon whether the data relating to said first group has been saved or not;

if the data has not been saved, backing up said cache memory by the battery unit regardless of whether the data relating to said first group has been saved;

providing the battery unit which performs the above-described processing in each of said first and second groups; and when one battery unit has been replaced, entering and storing information, which has been stored in the other battery unit and indicates whether data has been saved or not, in said one battery unit.

10. A control method in a disk control unit equipped with first and second groups each having a channel adapter for interfacing the host apparatus, a device adapter for interfacing the disk device, a resource manager, equipped with a control table store, for performing control related to overall resource management and processing operations, and a service adapter for executing initial microprogram loading, status monitoring processing and malfunction recovery processing, and a cache memory provided so as to be shared by said first and second groups, wherein data commanded from the host apparatus is written in said disk device via said cache memory or data read from the disk device is transferred to the host apparatus via the cache memory, comprising the steps of:

interconnecting the resource managers of the respective groups by a conduction-state notification signal line, an operating-state notification signal line for notifying of distinction between ready/not-ready, an interrupt line for notifying presence of a message to be communicated, and a copy bus;

in a case where the resource manager of one group has updated contents of said control table when the resource managers of both groups are operating normally, notifying the resource manager of the other group of updating via the interrupt line;

causing the resource manager of the other group to read the updated data out of the control table store of said one group via the copy bus; and causing the resource manager of the other group to update its own control table store by this data.

11. The method according to claim 10, further comprising the steps of:

causing the resource manager of one group to identify the ready/not-ready state of the resource manager of the other group from the operating-state notification signal line after completion of initial microprogram loading;

in case of the ready state, causing the resource manager of the one group to investigate, by inter-manager communication using the interrupt line and copy bus, whether the resource manager of the other group is in a state awaiting another party, a control-table initialization state or an online operation in-progress state;

initializing the control table if the other party's resource manager is in the waiting state;

if the other party's resource manager is undergoing initialization of its control table, waiting for completion of initialization of the other party's control table and copying the contents of the control table; and if the other party's resource manager is currently performing an online operation, copying the other party's table.

12. The method according to claim 10, further comprising the steps of:

causing the resource manager of one group to identify the ready/not-ready state of the resource manager of the other group from the operating-state notification signal line after completion of initial microprogram loading;

in case of the not-ready state, causing the resource manager of the one group to inquire, by inter-manager communication using the interrupt line and copy bus, about the status of the resource manager of the other group;

if the other party fails to respond to the inquiry upon elapse of a set period of time, inquiring of the service adapter about the status of the other party's resource manager; and if the other party's resource manager is in the ready state, halting its own operation on the assumption that a signal line is faulty, and, if the other party's resource manager is in the not-ready state, performing initialization of the control table.

13. The method according to claim 11, further comprising a step of causing the resource manager of a predetermined one of the groups to execute initialization of the control table if the resource managers of both groups simultaneously attain the state in which they await the other party.

* * * * *